(12) United States Patent
Nishikawa et al.

(10) Patent No.: US 11,379,107 B2
(45) Date of Patent: Jul. 5, 2022

(54) DISPLAY DEVICE, DISPLAY METHOD, AND PROGRAM

(71) Applicant: SHARP KABUSHIKI KAISHA, Sakai (JP)

(72) Inventors: Tohru Nishikawa, Sakai (JP); Takashi Hara, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/548,004

(22) Filed: Aug. 22, 2019

(65) Prior Publication Data
US 2020/0064978 A1  Feb. 27, 2020

(30) Foreign Application Priority Data
Aug. 27, 2018  (JP) .............................. JP2018-158281

(51) Int. Cl.
G06F 3/0485  (2022.01)
G06F 3/0482  (2013.01)
H04N 1/00  (2006.01)

(52) U.S. Cl.
CPC .......... G06F 3/0485 (2013.01); G06F 3/0482 (2013.01); H04N 1/00411 (2013.01); G06F 2203/04803 (2013.01); H04N 2201/0094 (2013.01)

(58) Field of Classification Search
CPC ............... G06F 3/0485; G06F 3/0482; G06F 2203/04803; G06F 3/1201; G06F 3/1203; G06F 3/1253; G06F 3/1284; H04N 1/00411; H04N 2201/0094; H04N 1/00408; H04N 1/00413; H04N 1/00384; H04N 1/00392; H04N 1/00472; H04N 1/00509; H04N 1/00488
See application file for complete search history.

(56) References Cited

U.S. PATENT DOCUMENTS

| 5,943,053 | A | * | 8/1999 | Ludolph | ............... | G06F 3/0481 |
| | | | | | | 715/790 |
| 8,661,363 | B2 | * | 2/2014 | Platzer | ................ | G06F 3/04845 |
| | | | | | | 715/784 |
| 10,863,016 | B2 | | 12/2020 | Senoo et al. | | |
| 2010/0231612 | A1 | * | 9/2010 | Chaudhri | ............... | G06F 3/0485 |
| | | | | | | 345/684 |
| 2011/0055752 | A1 | * | 3/2011 | Rubinstein | ............ | G06F 3/0485 |
| | | | | | | 715/784 |

(Continued)

FOREIGN PATENT DOCUMENTS

| JP | 2015-200977 A | 11/2015 |
| JP | 2017-91243 A | 5/2017 |

Primary Examiner — Yongjia Pan
(74) Attorney, Agent, or Firm — ScienBiziP, P.C.

(57) ABSTRACT

This display device includes: an operation detector that detects an operation; a display that displays a screen including a first area capable of being scroll-displayed, and a second area; and a display controller that performs a control that displays, in the first area, display elements including a specific display element. The display controller scroll-displays the display elements displayed in the first area when the operation detector detects a scroll operation, and accommodatively displays the specific display element in the second area if, as a result of the scroll-display, the specific display element is scrolled in the direction of the second area and displayed.

13 Claims, 26 Drawing Sheets

(56) References Cited

U.S. PATENT DOCUMENTS

| | | | |
|---|---|---|---|
| 2013/0093795 A1* | 4/2013 | Miyazaki | G06F 3/0485 345/684 |
| 2013/0111330 A1* | 5/2013 | Staikos | G06F 40/10 715/241 |
| 2013/0222435 A1* | 8/2013 | Choi | G06F 3/0485 345/684 |
| 2013/0339830 A1* | 12/2013 | Yuan | G06F 3/04847 715/209 |
| 2014/0129980 A1* | 5/2014 | Lee | G06F 3/04883 715/810 |
| 2014/0282232 A1* | 9/2014 | Oh | G06F 3/0488 715/800 |
| 2014/0317556 A1* | 10/2014 | Ellenich | G06F 3/0485 715/784 |
| 2015/0033188 A1* | 1/2015 | Devi | G06F 3/0488 715/824 |
| 2015/0074592 A1* | 3/2015 | Kusch | G06F 3/0485 715/784 |
| 2015/0324079 A1* | 11/2015 | Kashima | G06F 3/0485 715/784 |
| 2015/0363055 A1* | 12/2015 | Katsumata | G06F 3/147 715/830 |
| 2017/0134561 A1 | 5/2017 | Senoo et al. | |

\* cited by examiner

DISPLAY DEVICE, DISPLAY METHOD, AND PROGRAM

BACKGROUND OF THE INVENTION

Field of the Invention

The present invention relates to a display device and the like.

Description of the Background Art

Conventionally, in devices provided with a display unit, a technique that scrolls the display unit to enable all of the display content displayed on the display unit to be viewed is used. Furthermore, a technique for improving user convenience in such a display has been proposed.

For example, there is proposed a technique that, when a magnifying glass is used in a real screen area in which screen information is enlarged, displays the screen information of the display area on the magnifying glass in response to an operation that moves beyond the range of the display screen, and further, follows the movement of the magnifying glass to scroll the screen information of the real screen area (for example, see Japanese Unexamined Patent Application Publication No. 2015-200977).

However, in the technique disclosed in Japanese Unexamined Patent Application Publication No. 2015-200977, when the screen information is scrolled, a user-operable button displayed to that point is no longer enclosed within the screen area, and therefore, the button is no longer displayed in the screen area. As a result, the user is unable to recognize the presence of the button even if the user views the scrolled screen information.

In view of the problems described above, the present invention has an object of providing a display device and the like that, in a screen including a first area and a second area, performs control in which a specific display element displayed in the first area is also displayed in the second area.

SUMMARY OF THE INVENTION

In order to solve the problems described above, a display device of the present invention includes:
an operation detector that detects an operation;
a display that displays a screen including a first area capable of being scroll-displayed, and a second area; and
a display controller that performs a control that displays, in the first area, display elements including a specific display element, wherein
the display controller
scroll-displays the display elements displayed in the first area when the operation detector detects a scroll operation, and
accommodatively displays the specific display element in the second area if, as a result of the scroll-display, the specific display element is scrolled in the direction of the second area and displayed.

A display method of the present invention includes:
detecting an operation;
displaying a screen including a first area capable of being scroll-displayed, and a second area; and
performing a control that displays, in the first area, display elements including a specific display element, wherein
performing the control includes
scroll-displaying the display elements displayed in the first area when a scroll operation is detected, and
accommodatively displaying the specific display element in the second area if, as a result of the scroll-display, the specific display element is scrolled in the direction of the second area and displayed.

A program of the present invention causes a computer to implement:
an operation detection function that detects an operation;
a display function that displays a screen including a first area capable of being scroll-displayed, and a second area; and
a display control function that performs a control that displays, in the first area, display elements including a specific display element, wherein
the display control function
scroll-displays the display elements displayed in the first area when the operation detection function detects a scroll operation, and
accommodatively displays the specific display element in the second area if, as a result of the scroll-display, the specific display element is scrolled in the direction of the second area and displayed.

According to the present invention, in a screen including a first area and a second area, a specific display element among the display elements displayed in the first area is displayed in the second area in an accommodatively displayed form. Here, as a result of designating a button that accepts an operation from the user as the specific display element, the user is capable of recognizing the presence of the button serving as the specific display element by checking the first area and the second area.

DESCRIPTION OF THE PREFERRED EMBODIMENTS

Hereinafter, embodiments of the present invention will be described with reference to the drawings. In the present embodiment, an image forming device including a display device to which the present embodiment is applied is described as an example.

1. First Embodiment

1.1 Functional Configuration

Figure 1:
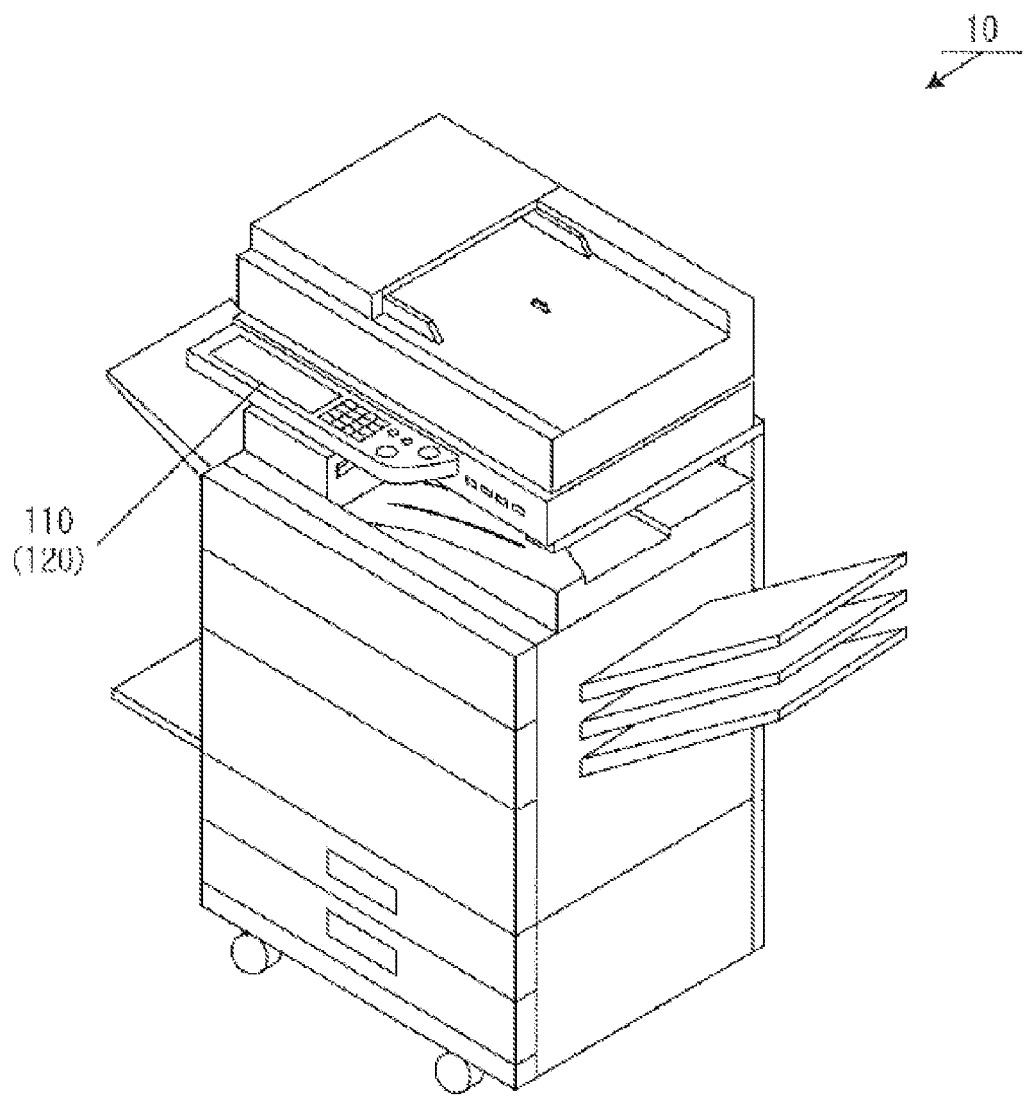
FIG. 1 is a diagram for illustrating an overall configuration of a first embodiment.
Figure 2:
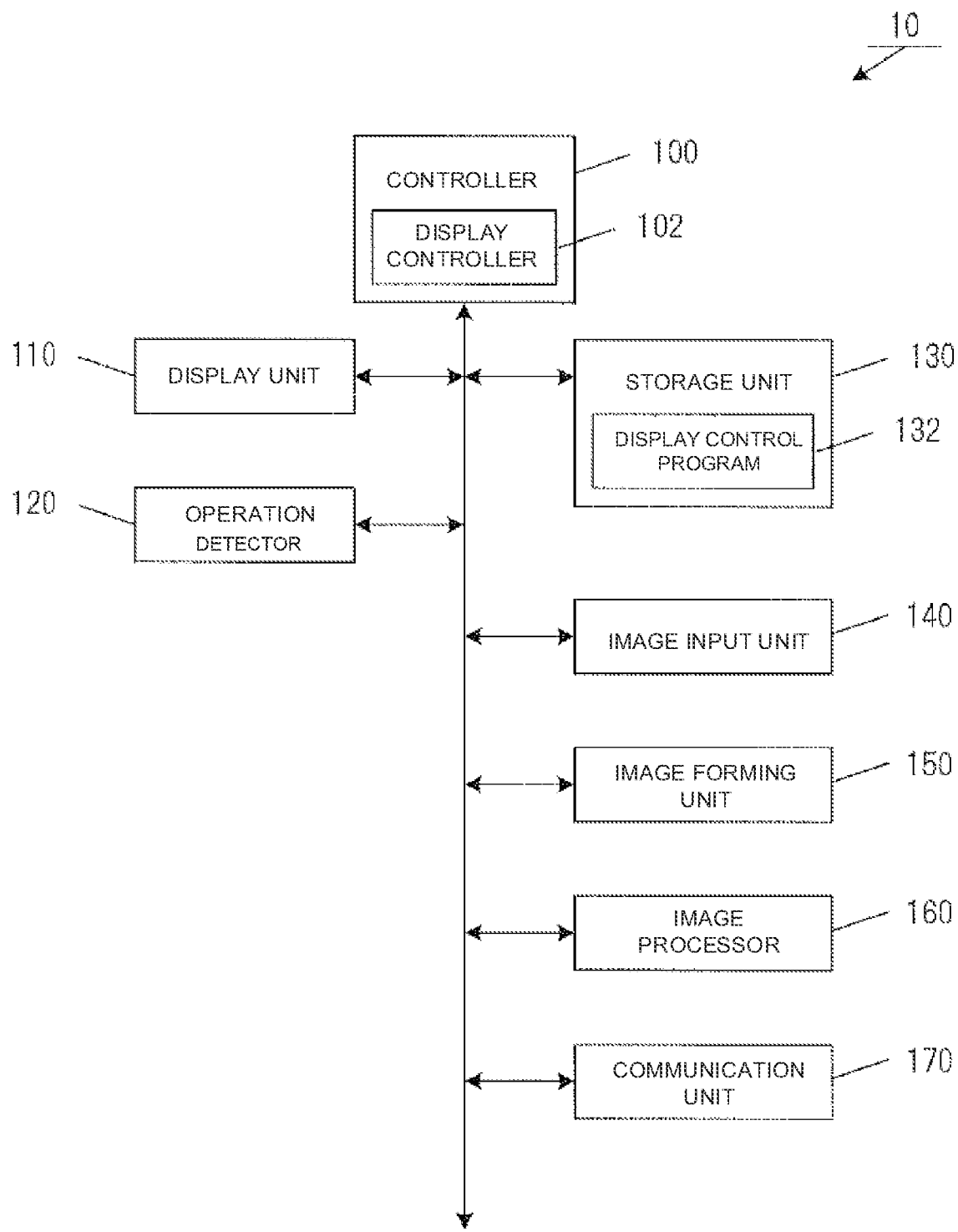
FIG. 2 is a diagram for illustrating a functional configuration of an image forming device of the first embodiment.

First, an overall configuration of a first embodiment will be described. FIG. 1 is an external perspective view showing an image forming device 10 including a display device to which the present invention is applied. FIG. 2 is a functional configuration diagram of the image forming device 10.

As shown in FIG. 2, the image forming device 10 includes a controller 100, a display unit 110, an operation detector 120, a storage unit 130, an image input unit 140, an image forming unit 150, an image processor 160, and a communication unit 170.

The controller 100 is a functional unit for controlling the image forming device 10 as a whole. The controller 100 realizes various functions by reading and executing various programs, and is constituted, for example, by one or more computation devices (for example, a central processing unit (CPU)) and the like.

Furthermore, the controller 100 functions as a display controller 102 by reading and executing a display control program 132 described below. The display controller 102 is a functional unit for controlling the display on the display unit 110. The display controller 102 performs a control that displays one or more display elements on the display unit 110. Here, a display element is an element that constitutes the screen displayed on the display unit 110. Specifically, a display element is an element that displays information, such as a character string (label), an icon, or an image, or a user-operable element such as a button, a radio button, a list, a slider, or a menu. An area (such as a panel) that includes a display element may also be treated as a display element.

When many display elements are included in a predetermined area secured on the display unit 110, some of the display elements may lie outside the predetermined area such that they are no longer displayed in the predetermined area. Therefore, among the display elements, some display elements are in a state where they are displayed in the predetermined area (hereinafter referred to as "in the displayed state"), and some display elements are in a state where they are not being displayed in the predetermined area (hereinafter referred to as "in the non-displayed state").

In order for those display elements in the non-displayed state to be switched to the displayed state, the display controller 102 performs a control that scroll-displays the display elements. A scroll-display is display control method that moves all of the display elements displayed in the predetermined area, which is secured on the display unit 110, by a fixed distance in a fixed direction. As a result, some of the display elements in the non-displayed state switch to the displayed state. On the other hand, some of the display elements in the displayed state switch to the non-displayed state. The movement direction of the scroll-display is referred to as a scroll direction, and the movement distance is referred to as a scroll amount.

The display controller 102 executes a scroll-display according to a scroll operation detected by the operation detector 120. A scroll operation is an operation that specifies a scroll direction and a scroll amount, and is, for example, a touch operation such as a swipe. In this case, the direction that the finger moves represents the scroll direction, and the distance that the finger moves represents the scroll amount.

The scroll operation may additionally be a flick operation, an operation that moves a mouse wheel, an operation that selects a keyboard arrow key, or an operation that moves a handle or selects a scroll button included in a scroll bar.

The display unit 110 is a functional unit for displaying various information to the user, and is constituted by, for example, a liquid crystal display (LCD). Furthermore, the operation detector 120 is a functional unit that detects an operation by the user, and is constituted by various key switches and devices that detect touch inputs. The user sets the functions to be used and the output conditions via the operation detector 120.

The display unit 110 and the operation detector 120 may be separately configured. However, they may be configured as a touch panel in which the display unit 110 and the operation detector 120 are integrally formed. The method of detecting inputs to the touch panel may be a general detection method such as a resistance film method, an infrared method, an electromagnetic induction method, or a capacitance method. The image forming device 10 of the present embodiment is described assuming that the display unit 110 and the operation detector 120 are integrally formed, and operate as a touch panel.

The storage unit 130 is a functional unit that stores various programs and various data required for operation of the image forming device 10. The storage unit 130 is constituted by, for example, a semiconductor memory such as a solid state drive (SSD) or hard disk drive (HDD).

Furthermore, the storage unit 130 stores a display control program 132, which is a program for causing the controller 100 to function as the display controller 102.

The image input unit 140 is a functional unit for reading image data input to the image forming device 10. The image input unit 140 is connected to a document reader, which is a functional unit that reads a document image, and inputs the image data output from the document reader. Furthermore, the image input unit 140 may input image data from another terminal device via the communication unit 170. Moreover, the image input unit 140 may input image data from a storage medium such as a Universal Serial Bus (USB) memory or an SD card.

The image forming unit 150 is a functional unit for forming output data on a recording medium (such as a recording paper sheet) based on the image data. For example, a recording paper sheet is fed from a paper feeding tray, which is then discharged from a paper discharge tray after an image is formed on the surface of the recording paper sheet in the image forming unit 150. The image forming unit 150 is constituted by, for example, a laser printer that uses an electrophotographic method.

The image processor 160 is a functional unit that performs various image processing with respect to the image data. For example, sharpening processing and color conversion processing is performed with respect to the image data.

The communication unit 170 is a functional unit for enabling the image forming device 10 to perform communication with other devices. For example, the communication unit 170 is realized by a Network Interface Card (NIC) used by a wired/wireless local area network (LAN), or a communication module capable of connecting to a 3G/LTE/5G network.

1.2 Processing Flow

Next, main processing according to the present embodiment will be described. Main processing according to the present embodiment is executed as a result of the display control program 132 being read by the controller 100, and then executed as a result of the controller 100 operating as the display controller 102.

In the present embodiment, it is assumed that the display area of the display unit 110 includes two areas. The respective areas are referred to as a client area (first area) and a title area (second area).

The client area is an area capable of being scroll-displayed, and is an area in which display elements including a specific display element are displayed. Furthermore, the title area is an area that displays a title character string (for example, "administrator mode") that represents the display content in the client area. The title area is an area secured above the client area, and has a size (height) which is sufficient for displaying the title character string. In this manner, the title area may be secured as a smaller area than the client area.

Here, the specific display element is a display element included in the client area, and is a display element which is accommodatively displayed in the title area. For example, it represents a display element such as a button. A button is an element which is displayed on the screen for accepting an operation such as selection by the user. The user is capable of instructing the image forming device 10 to perform predetermined processing by selecting the button.

The specific display element is accommodatively displayed in the title area. When the specific display element is accommodatively displayed, it is displayed in a form that causes the user to visually confirm the presence of the specific display element, and the specific display element is displayed such that it matches the size of the title area, and is accommodated inside the title area. For example, if the specific display element is a button, a graphic imitating the shape of the button is displayed in the title area as an accommodatively displayed specific display element. In this manner, the accommodatively displayed specific display element is displayed in a basic form compared to the originally displayed form of the specific display element. In terms of the displayed form of the accommodatively displayed button, the button is displayed as a graphic that only preserves the outline of the button as a result of omitting the display of the character section displayed on the button, and setting the background color to be the same color as the background color of the title area. In this manner, by accommodatively displaying the specific display element, the user is capable of visually confirming the presence of the specific display element more easily.

If a graphic is displayed as the accommodatively displayed specific display element, the background color of the graphic may be set to the same color as the background color of the specific display element (for example, a button), or may be set to another color which is a different color to both the background color of the specific display element and the background color of the title area. Furthermore, the accommodatively displayed specific display element may display only the characters (for example, the characters displayed on the surface of the button) displayed on the specific display element, without displaying the outline or background color of the specific display element. Moreover, the graphic and the characters and the like that accommodatively display the specific display element may be displayed based on the display position in which the specific display element is displayed, or on the width of the specific display element. The accommodatively displayed specific display element cannot be selected by the user.

To summarize the above, when a specific button is designated as the specific display element among the display elements displayed in the client area, the button is displayed as a button in the client area and displayed as a graphic in the title area. While being displayed as a button, the user is capable of instructing the image forming device 10 to perform predetermined processing by selecting the button. However, when the button is displayed as a graphic, the user is unable to instruct the image forming device 10 to perform predetermined processing by selecting the graphic.

The designer of the image forming device 10 or the like may set in advance which of the display elements among the display elements included in the client area is designated as the specific display element. The image forming device 10 may also determine the specific display element. For example, a display element displayed in a predetermined position, such as the uppermost portion of the client area, may be determined as the specific display element. Further, a display element for instructing a screen transition or a display element for instructing specific processing may be determined as the specific display element.

Figure 3:
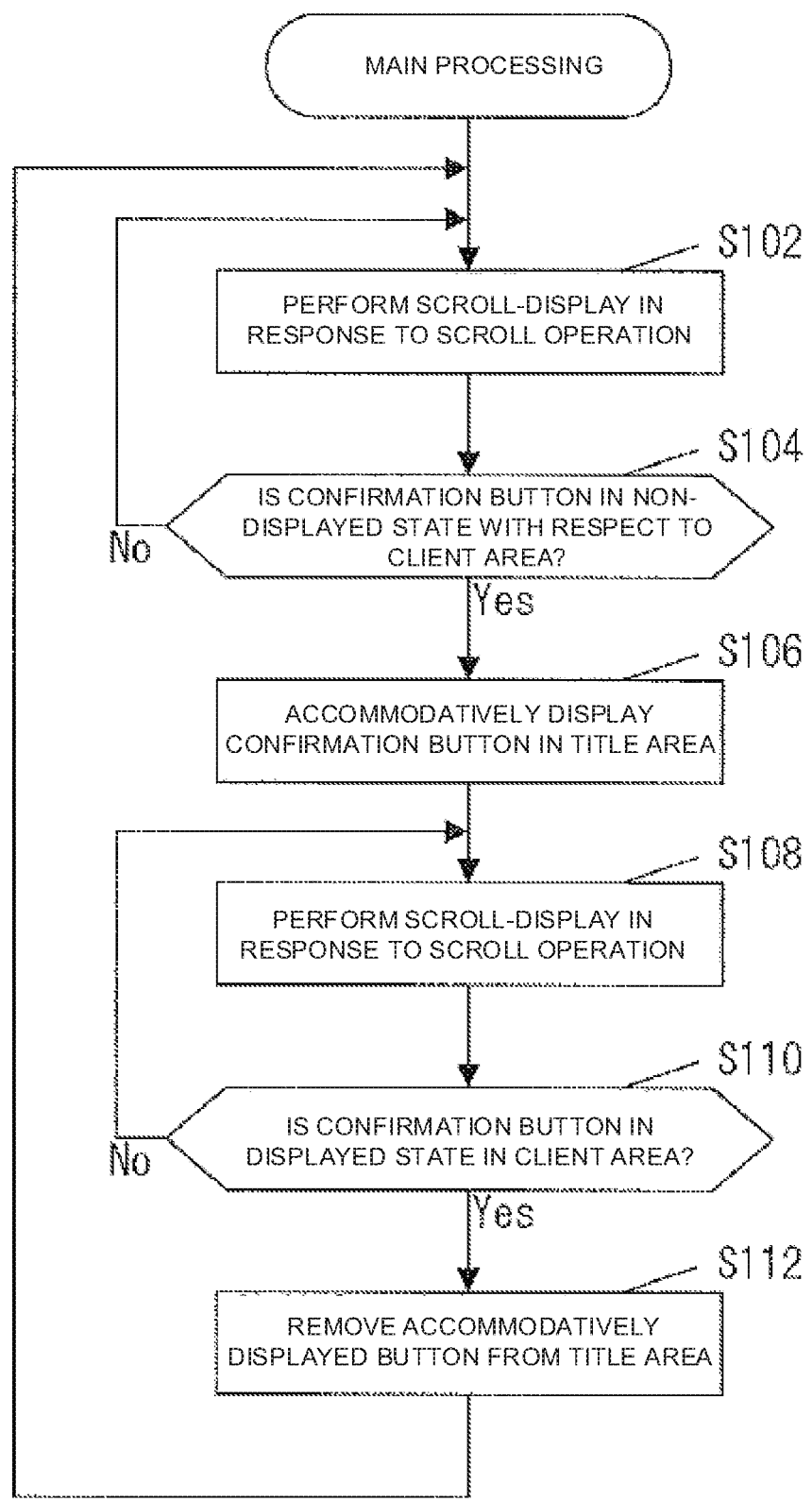
FIG. 3 is a flow diagram for illustrating main processing in a display controller of the first embodiment.

Hereinafter, the specific processing content performed by the display controller 102 will be described with reference to FIG. 3. In the present embodiment, the description assumes that a setting screen of the image forming device 10 is displayed in the client area, and a confirmation button for confirming the settings is the specific display element.

First, the display controller 102 scroll-displays the client area in response to a scroll operation by the user (step S102). Next, the display controller 102 determines whether or not the confirmation button serving as the specific display element is in the non-displayed state with respect to the client area, as a result of the display elements in the client area being scroll-displayed in the direction of the title area (step S104).

In the present embodiment, it is assumed that the confirmation button is in the displayed state if part or all of the confirmation button is displayed in the client area. A state where the entire confirmation button is not displayed in the client area is referred to as the non-displayed state. Whether or not the confirmation button is in the non-displayed state is determined by, for example, the display controller 102 determining whether or not the display target range defined by the client area includes the area in which the confirmation button is displayed. If the area in which the confirmation button is displayed is not included in the display target range defined by the client area, the display controller 102 determines that the confirmation button is in the non-displayed state with respect to the client area.

If the confirmation button is in the non-displayed state with respect to the client area, the display controller 102 accommodatively displays the confirmation button in the title area (step S104; Yes→step S106). In step S104, if the confirmation button is determined to be in the displayed state in the client area, the sequence returns to step S102 (step S104; No→step S102).

Next, in a state where the accommodatively displayed confirmation button is displayed in the title area, the display controller 102 scroll-displays the display elements included in the client area in response to the scroll operation (step S108). Then, the display controller 102 determines whether or not the confirmation button is in the displayed state in the client area (step S110). If the confirmation button is in the displayed state in the client area, the display controller 102 removes the accommodatively displayed confirmation button that was displayed in the title area in step S106 (step S110; Yes→step S112).

In step S110, if the confirmation button is determined to not be in the displayed state in the client area, the sequence returns to step S108 (step S110; No→step S108).

After completion of the processing of step S112, the sequence returns to step S102. As a result of such processing, an accommodatively displayed confirmation button can be displayed in the title area, even when the confirmation button is not in the displayed state in the client area.

As a result of such processing, the accommodatively displayed confirmation button is not displayed if the confirmation button is in the displayed state in the client area. On the other hand, the accommodatively displayed confirmation button is displayed if the confirmation button is in the non-displayed state with respect to the client area. Therefore, the confirmation button serving as the specific display element can be displayed either by being displayed in the client area, or by being accommodatively displayed in the title area.

1.3 Operation Example

Figure 4A:
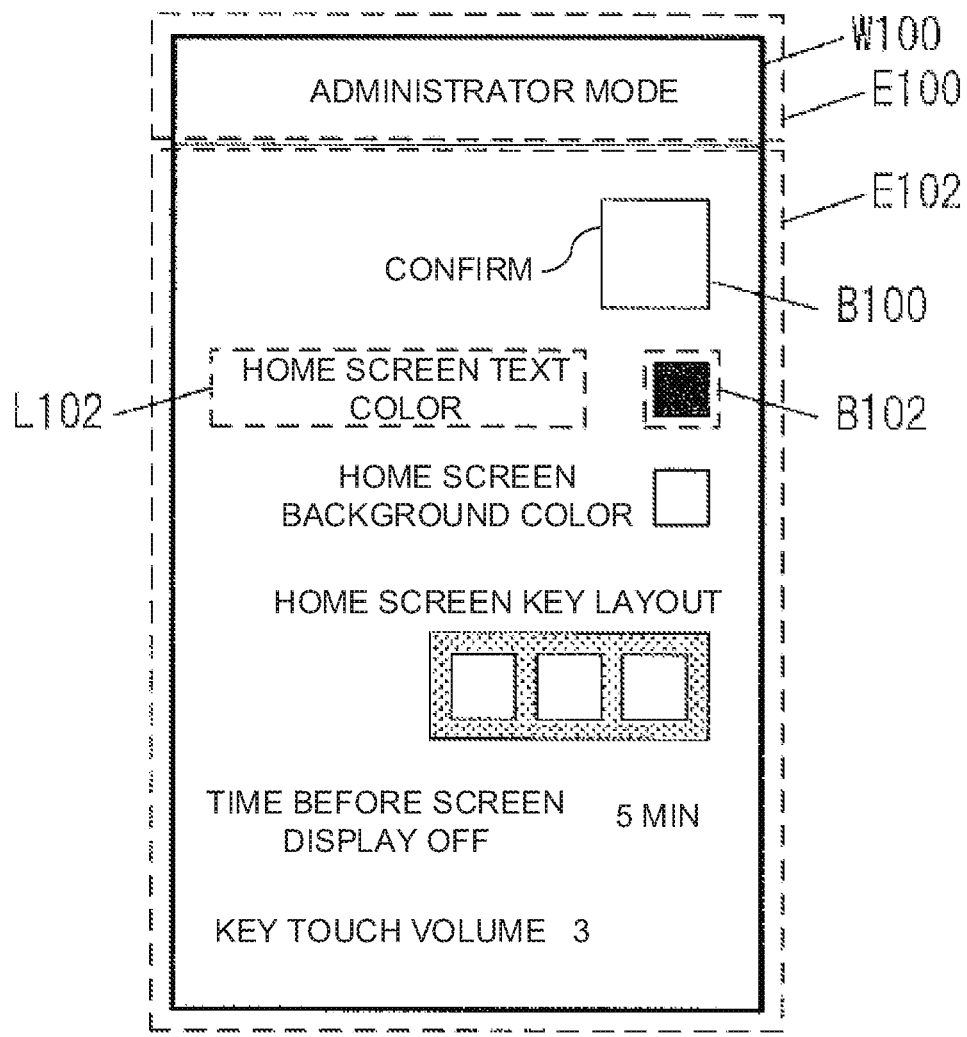
FIGS. 4A to 4C are diagrams for illustrating an operation example of the first embodiment.
Figure 4B:
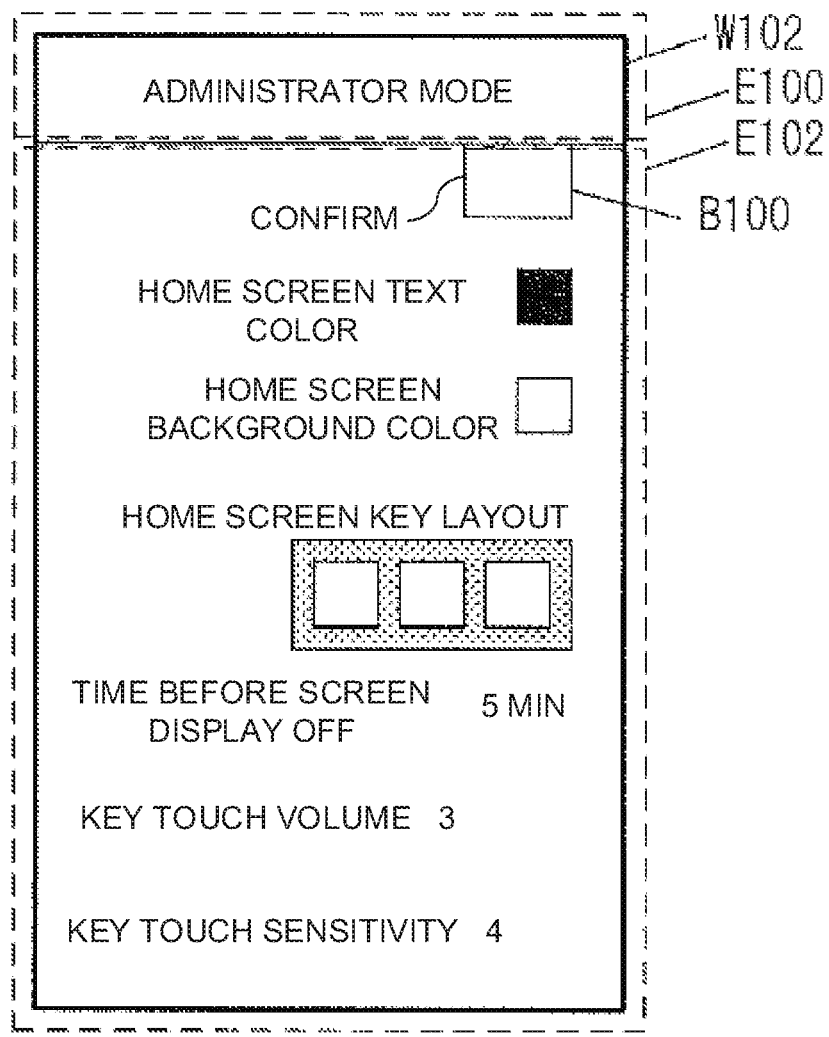
Figure 4C:
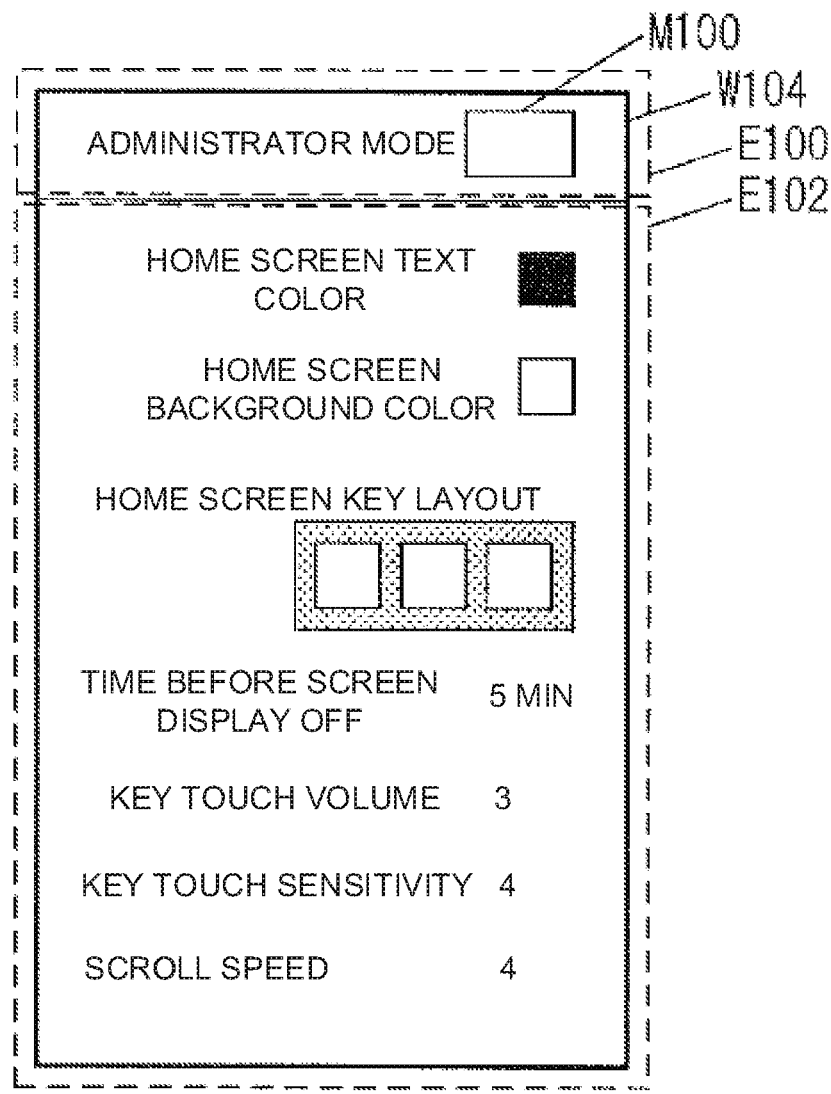

Next, an operation example of the present embodiment will be described with reference to the drawings. First, an operation that displays the accommodatively displayed confirmation button in the title area will be described with reference to FIGS. 4A to 4C. FIG. 4A is a display example when a setting screen of the image forming device 10 is displayed on the display unit 110. FIG. 4B is a display example when a scroll operation is being performed. FIG. 4C is a display example of a case where the confirmation button is in the non-displayed state with respect to the client area.

As shown in FIG. 4A, the display unit 110 of the image forming device 10 displays, as a setting screen, a screen display W100 including a title area E100 and a client area E102. The title area E100 is disposed above the client area E102 and displays the title character string "administrator mode". The client area E102 includes display elements such as a confirmation button B100, a label L102 that displays a setting item name, and a color selection button B102.

When the operation detector 120 detects a scroll operation with respect to the client area E102 in an upward direction, which is the direction where the title area E100 is displayed, the display controller 102 scroll-displays the display elements included in the client area E102 in the upward direction. As a result, as shown in FIG. 4B, a display screen W102 is displayed on the display unit 110 in which the display elements included in the client area E102 have moved upward.

Some of the display elements included in the client area E102 may overlap with the position in which the title area E100 is displayed. The display elements that overlap with the display position of the title area E100 are displayed such that they are hidden below the title area E100. For example, in the example of FIG. 4B, the confirmation button B100 is displayed such that it is partially hidden below the title area E100.

When the operation detector 120 detects an additional scroll operation with respect to the client area E102 in the direction of the title area E100, the display controller 102 scroll-displays the display elements included in the client area E102 in the upward direction, which is the direction of the title area E100. As a result, a screen display W104 as shown in FIG. 4C is displayed on the display unit 110. FIG. 4C is a display example when the confirmation button B100 is in the non-displayed state with respect to the client area E102. In this case, the display controller 102 displays an accommodatively displayed confirmation button M100 in the title area E100. FIG. 4C is an example where the display controller 102 displays the accommodatively displayed confirmation button M100 in a position that corresponds to the horizontal position in which the confirmation button B100 is disposed. In this manner, the user is capable of visually confirming that the confirmation button B100 is included in the client area E102, and also the position of the confirmation button B100 in the displayed state.

In the state shown in FIG. 4C, when the operation detector 120 detects a scroll operation with respect to the client area E102 in the direction of the title area E100, the display controller 102 scroll-displays the display elements included in the client area E102 in the upward direction, which is the direction of the title area E100. At this time, the display elements included in the client area E102 are moved in the upward direction. The display elements other than the specific display element are in the non-displayed state with respect to the client area E102 as a result of the scroll-display. However, the accommodatively displayed confirmation button M100 remains displayed in the title area E100.

Furthermore, in the state shown in FIG. 4C, if the operation detector 120 detects a scroll operation with respect to the client area E102 in a downward direction, which is the opposite direction to the title area E100, the display controller 102 scroll-displays the display elements included in the client area E102 in the downward direction, which is the opposite direction to the title area E100. As a result, the display controller 102 displays the screens shown in FIG. 4B and FIG. 4A. That is to say, as a result of a scroll operation being performed in the downward direction by the user, which is the opposite direction to the title area E100, a part or all of the confirmation button B100 serving as the specific display element is displayed in the client area E102. Then, if the confirmation button B100 is in the displayed state, the display controller 102 removes the accommodatively displayed confirmation button M100.

The description assumes that an instruction is not made to perform predetermined processing when the accommodatively displayed confirmation button M100 is selected by the user. However, the display controller 102 may instead redisplay the confirmation button B100 when the user selects the accommodatively displayed confirmation button M100 or when a predetermined operation is performed.

Figure 5A:
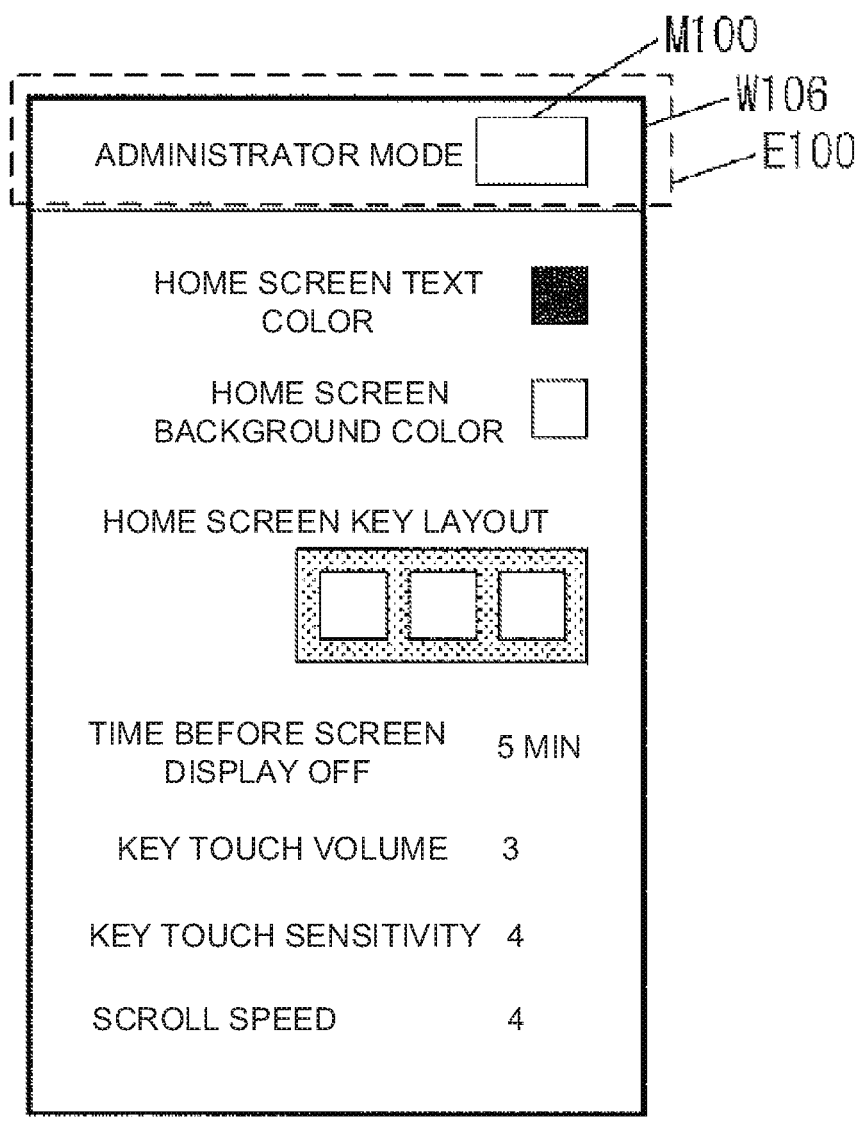
FIGS. 5A to 5C are diagrams for illustrating an operation example of the first embodiment.

For example, suppose that the display unit 110 is displaying the accommodatively displayed confirmation button M100 in the title area E100 as illustrated by the screen display W106 shown in FIG. 5A. In this state, if a scroll operation is performed in the downward direction, which is the opposite direction to the title area E100, the display controller 102 displays the screen display W108 shown in FIG. 5B, in which an area E104 including the confirmation button B100 overlaps the client area E102. Furthermore, in the state shown in FIG. 5B, if a scroll operation is performed in the upward direction, which is the direction of the title area E100, the display controller 102 removes the area E104, and displays the screen display W106 shown in FIG. 5A. In this manner, when the user would like to display the confirmation button B100, the confirmation button B100 can be immediately displayed in the client area E102 by performing a scroll operation in the opposite direction to the direction of the title area.

Figure 5B:
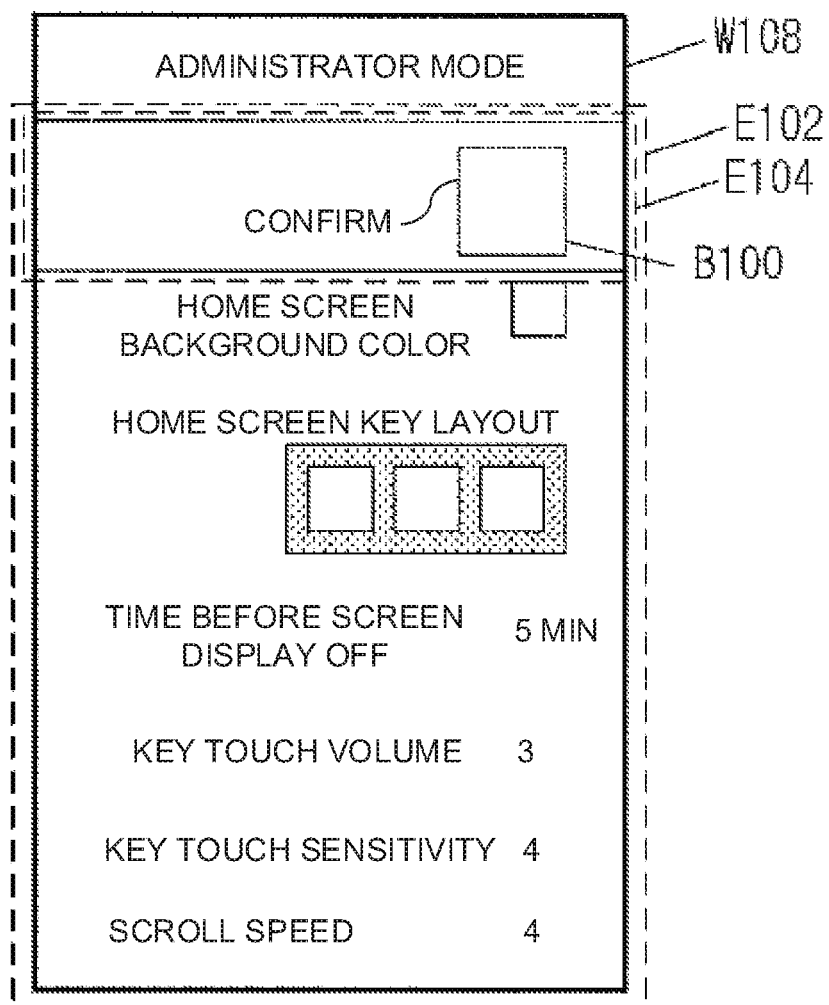
Figure 5C:
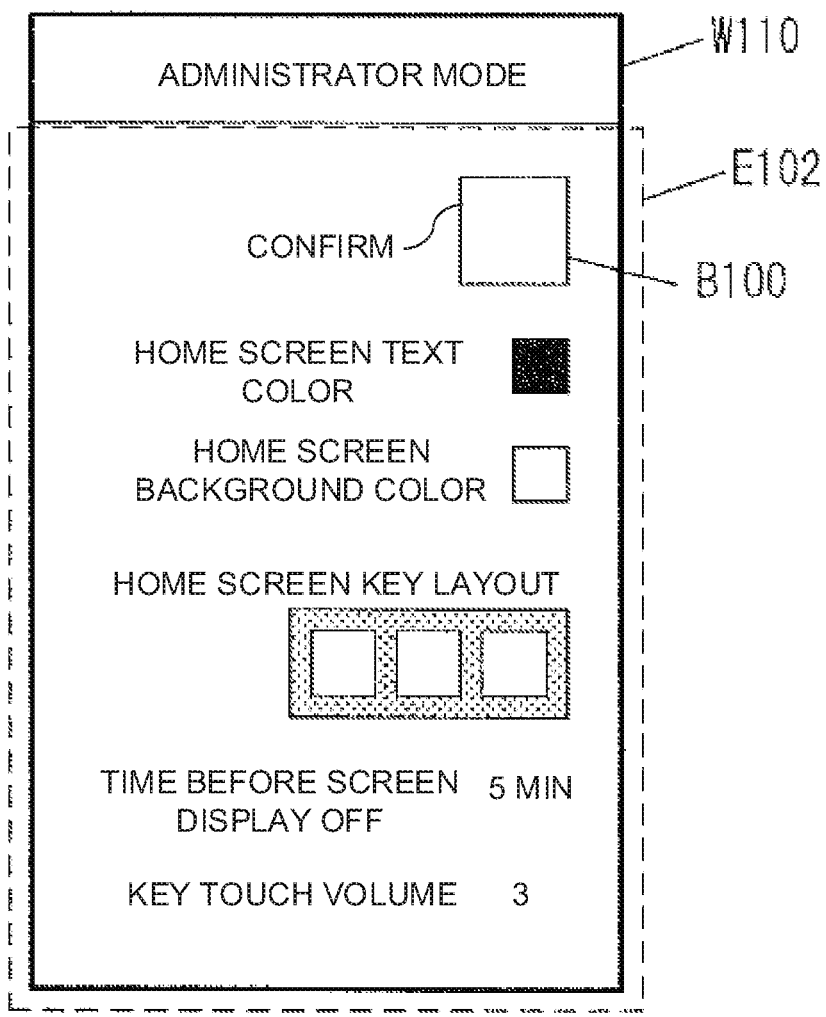

Similarly, if an operation that selects the title area E100 is performed when the accommodatively displayed confirmation button M100 is displayed in the title area E100, the display controller 102 may display the area E104 as shown in FIG. 5B. Furthermore, if the title area E100 is selected by the user, the display controller 102 may scroll-display the display elements in the client area E102 such that the confirmation button B100 is displayed in the client area E102, thereby displaying the screen display W110 shown in FIG. 5C.

Figure 6A:
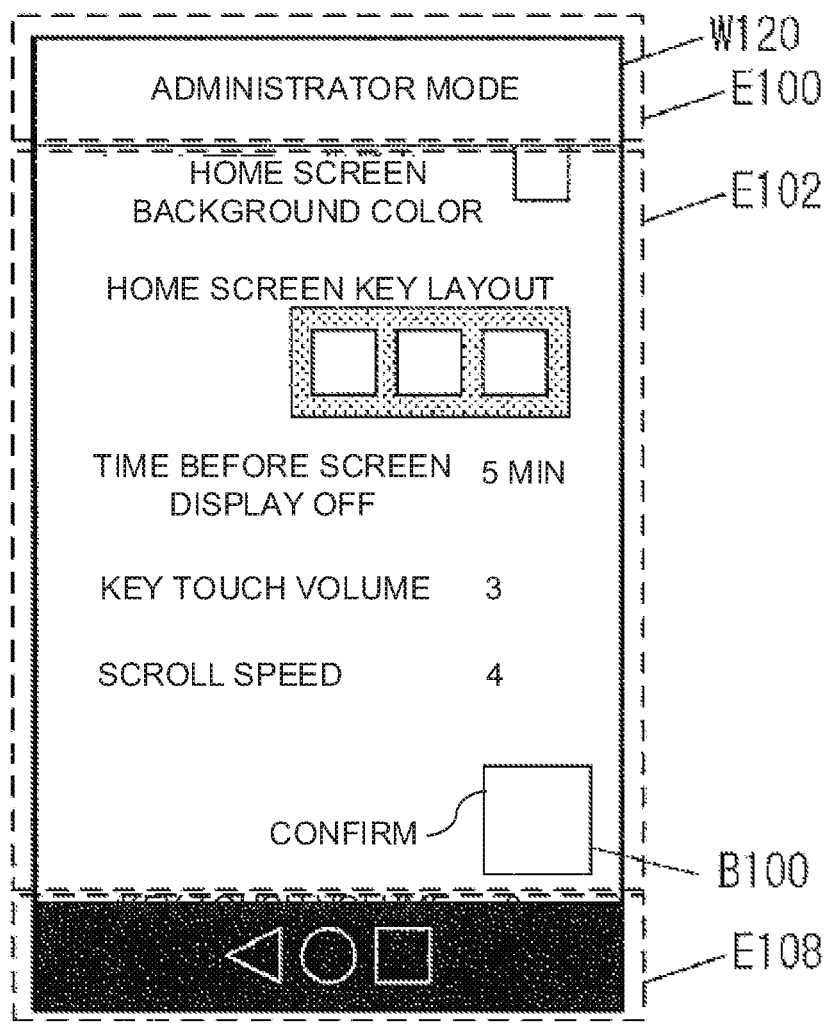
FIGS. 6A to 6C are diagrams for illustrating an operation example of the first embodiment.

As another operation example, the area that displays the accommodatively displayed specific display element may be an area other than the title area E100. For example, as shown in FIG. 6A, if a status area E108 is displayed below the client area E102, the display controller 102 may display the accommodatively displayed specific display element in the status area E108. That is to say, the status area E108 serves as the second area.

Figure 6B:
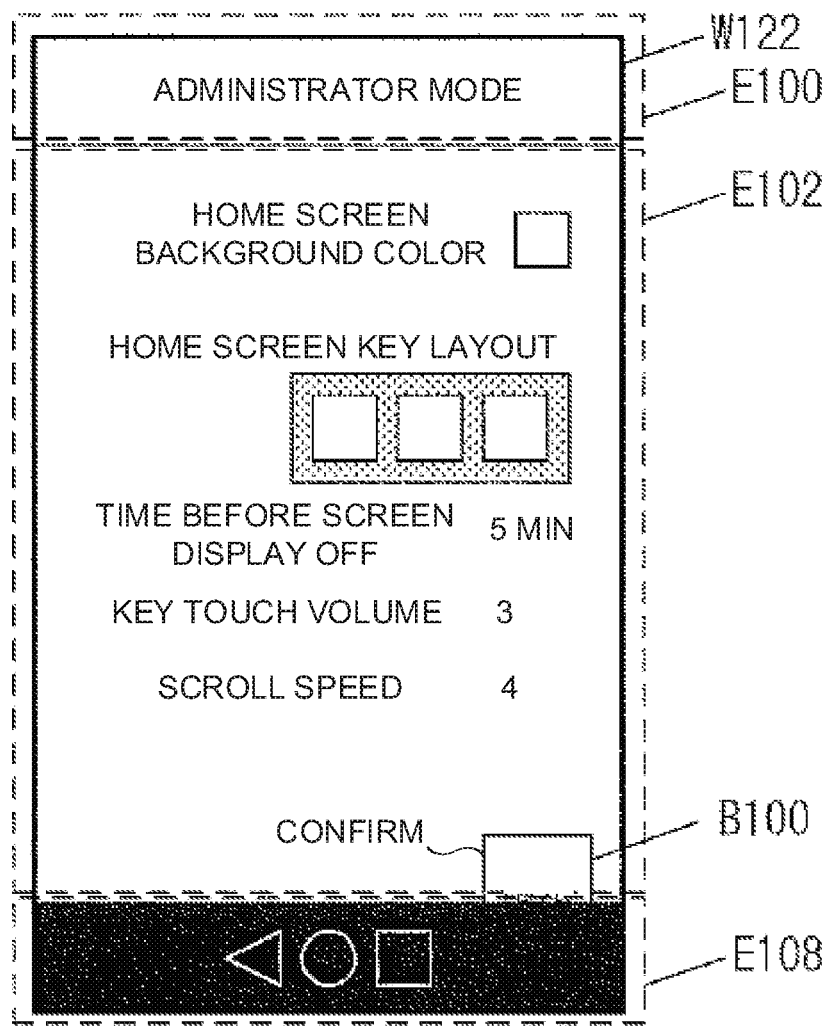
Figure 6C:
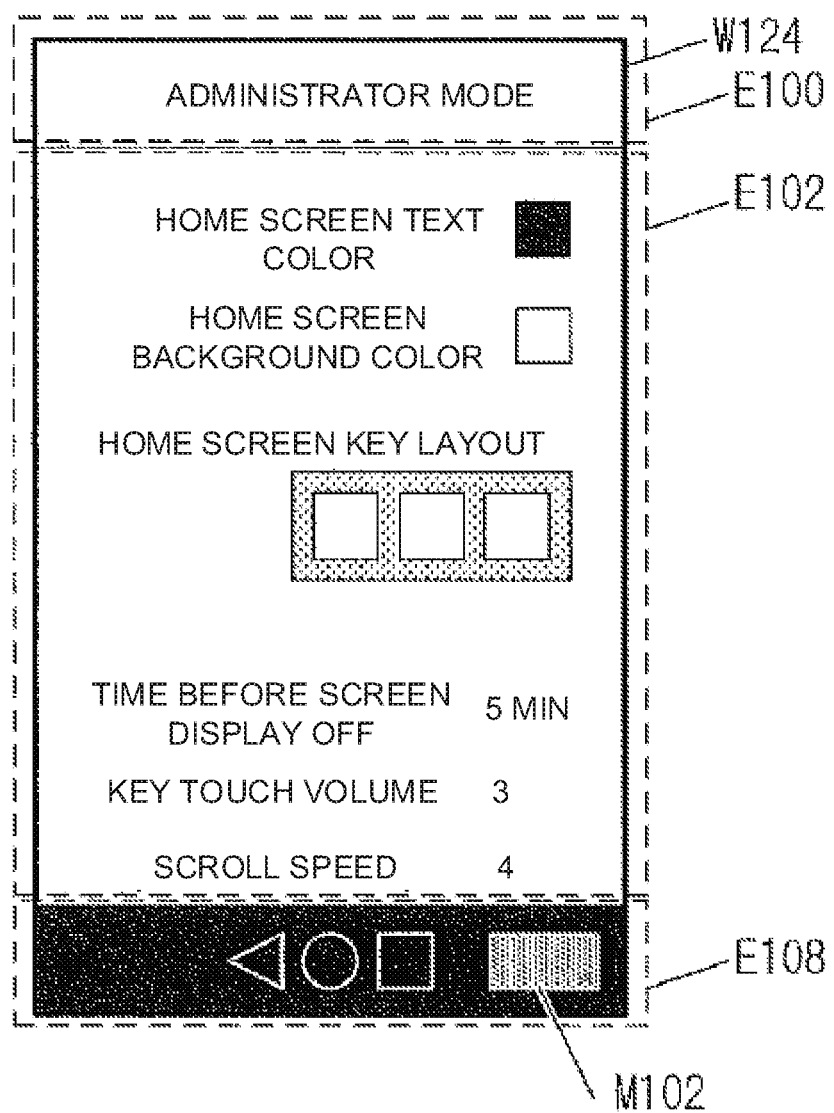

FIG. 6B is a display example of a screen display W122, in which a scroll operation has been performed in the downward direction, which is the direction of the status area E108, and part of the confirmation button B100 is no longer displayed in the client area E102. Furthermore, FIG. 6C is a display example of a screen display W124, in which an additional scroll operation has been performed in the downward direction, which is the direction of the status area E108, and the entire confirmation button B100 is no longer displayed in the client area E102. As shown in FIG. 7C, the display controller 102 displays an accommodatively displayed confirmation button M102 in the status area E108 instead of the confirmation button B100.

As yet another operation example, if the title area E100 above the client area E102 and the status area E108 below the client area E102 are both included, the accommodatively displayed specific display element may be displayed in the direction in which the specific display element is no longer displayed. For example, if the specific display element is subjected to a scroll operation in the direction of the title area E100 and is in the non-displayed state, the accommodatively displayed specific display element is displayed in the title area E100. Furthermore, if the specific display element is subjected to a scroll operation in the direction of the status area E108 and is in the non-displayed state, the accommodatively displayed specific display element is displayed in the status area E108. In this manner, it becomes possible for the user to visually confirm the direction to perform a scroll operation in order to display the specific display element.

Furthermore, if a plurality of rows of specific display elements exists, the display controller 102 may display accommodatively displayed specific display elements in the title area E100 such that they are successively switched.

The embodiment above was described assuming that a setting screen is displayed on the display unit 110 of the image forming device 10. However, for example, the display control program 132 may be executed by a terminal device such as a smartphone connected to the image forming device 10. In this manner, even in the case of a smartphone where the display area is limited, it becomes possible to display an accommodatively displayed specific display element in the title area E100.

According to the present embodiment, even when the specific display element is in the non-displayed state with respect to the client area, the accommodatively displayed specific display element is displayed in the title area. Therefore, the user is capable of grasping the presence of the specific display element with a single glance by visually confirming the title area.

Furthermore, the user is capable of immediately displaying the specific display element (such as a button) when necessary by performing a scroll operation in the opposite direction to the direction of the title area, or by selecting the title area displaying the accommodatively displayed specific display element. Therefore, an increase in user convenience can be expected.

Furthermore, when the specific display element is displayed, by displaying an area that includes the specific display element so as to overlap the client area, the display area is effectively used even when the display area is limited.

2. Second Embodiment

Next, a second embodiment will be described. The second embodiment is an embodiment in which an accommodatively displayed specific display element is partially displayed, even when the specific display element is partially displayed in the client area. The present embodiment replaces FIG. 3 of the first embodiment with FIG. 7. Further, the same reference numerals are given to the same functional units and processing, and the description will be omitted. The description assumes that the specific display element is a confirmation button.

Furthermore, in the present embodiment, it is assumed that a state in which the confirmation button is entirely displayed in the client area is the displayed state, and a state in which the confirmation button is entirely not displayed is the non-displayed state. Moreover, a state in which the confirmation button is partially displayed in the client area is a partially displayed state.

2.1 Processing Flow

Figure 7:
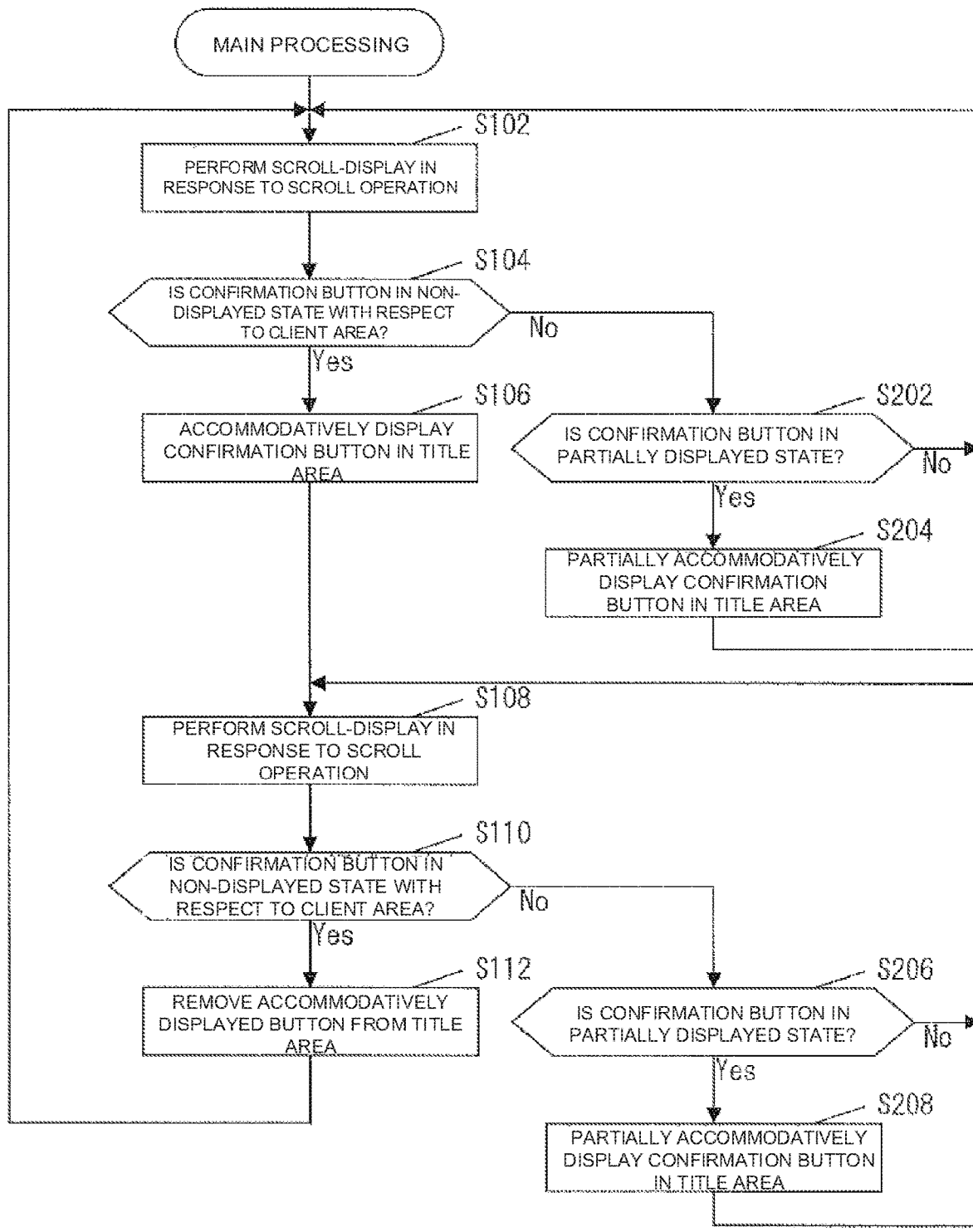
FIG. 7 is a flow diagram for illustrating main processing in a display controller of a second embodiment.

The flow of main processing in the present embodiment will be described with reference to FIG. 7. In step S104, if it is determined that the confirmation button is not in the non-displayed state with respect to the client area, then the display controller 102 determines whether or not the confirmation button is in the partially displayed state in the client area (step S104; No→step S202).

If the confirmation button is in the partially displayed state in the client area, the display controller 102 partially displays the accommodatively displayed confirmation button in the title area (step S202; Yes→step S204).

The size of the accommodatively displayed confirmation button may be changed according to the size of the confirmation button displayed in the client area. Specifically, if the proportion of the confirmation button displayed in the client area is small, the accommodatively displayed confirmation button which is displayed is large. If the proportion of the confirmation button displayed in the client area is large, the accommodatively displayed confirmation button which is displayed is small.

If the confirmation button is in the displayed state in the client area, the sequence returns to step S102 (step S202; No→step S102).

Furthermore, in step S110, if it is determined that the confirmation button is not in the displayed state in the client area, the display controller 102 then determines whether or not the confirmation button is in the partially displayed state in the client area (step S110; No→step S206). If the confirmation button is in the partially displayed state in the client area, the display controller 102 partially displays the accommodatively displayed confirmation button in the title area (step S206; Yes→step S208). If the confirmation button is in the non-displayed state with respect to the client area, the sequence returns to step S108 (step S206; No→step S108).

2.2 Operation Example

Figure 8A:
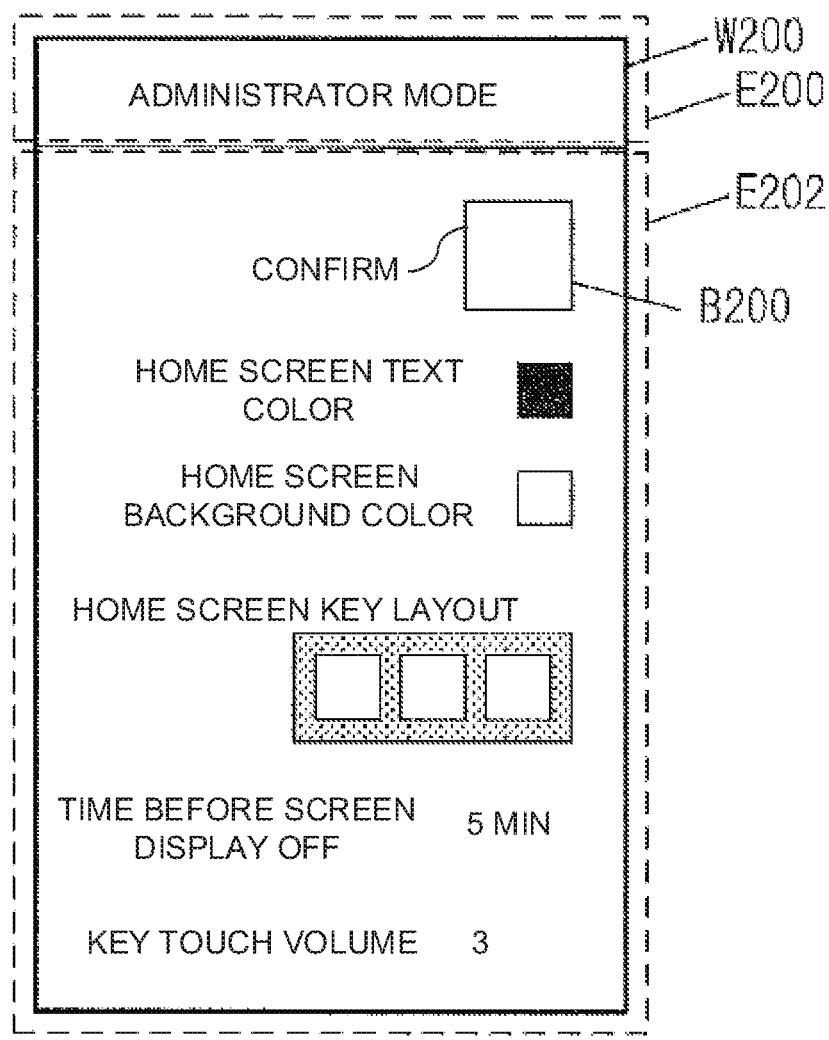
FIGS. 8A to 8C are diagrams for illustrating an operation example of the second embodiment.
Figure 8B:
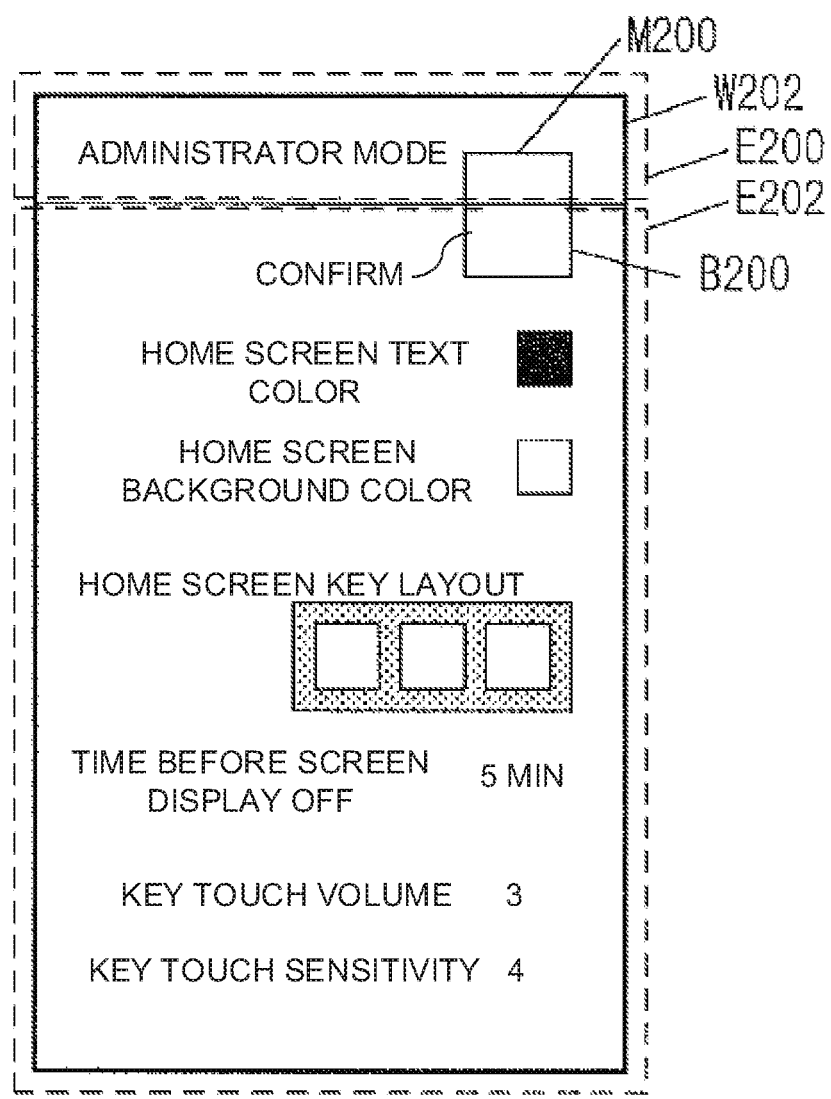
Figure 8C:
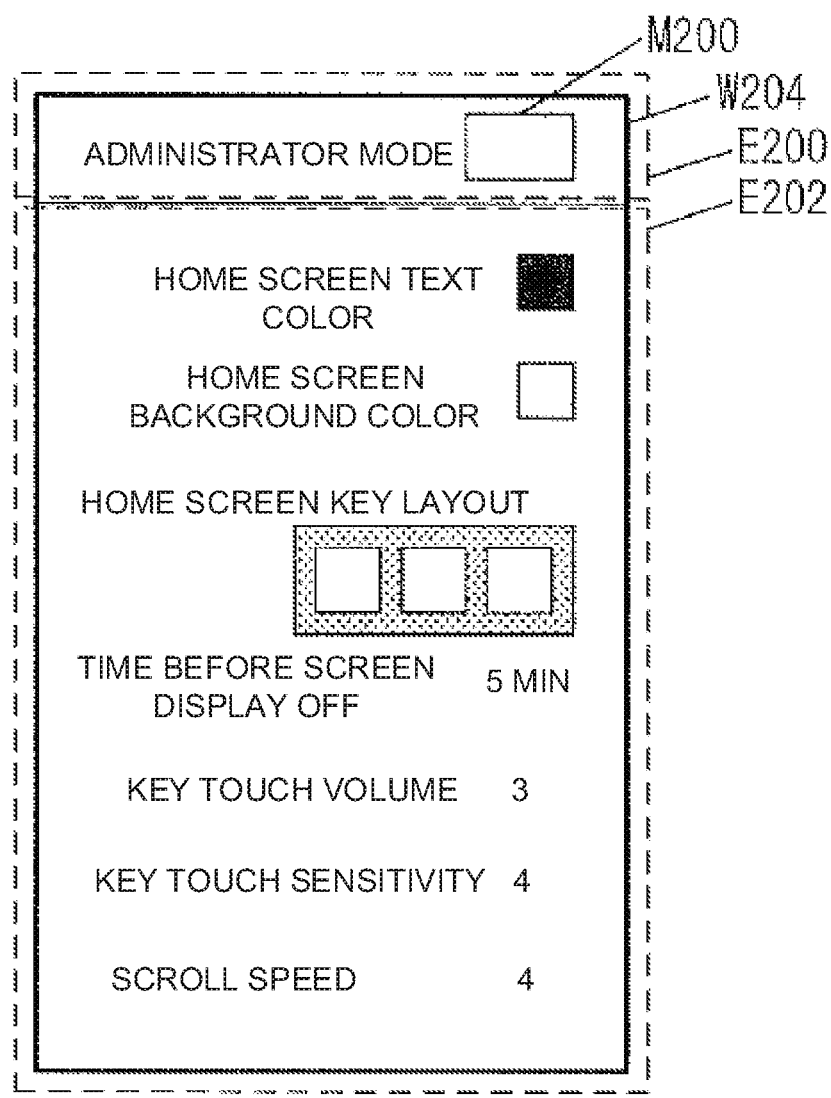

Next, an operation example of the present embodiment will be described with reference to the drawings. First, an operation that displays the accommodatively displayed confirmation button in the title area will be described with reference to FIGS. 8A to 8C. FIG. 8A is a display example of a case where the confirmation button is in the displayed state. FIG. 8B is a display example of a case where the confirmation button is in the partially displayed state. FIG. 8C is a display example of a case where the confirmation button is in the non-displayed state with respect to the client area.

As shown in FIG. 8A, the display unit 110 of the image forming device 10 displays, as a setting screen, a screen display W200 including a title area E200 and a client area E202. In the client area E202, display elements are displayed, including the confirmation button B200 serving as the specific display element.

When a scroll operation is performed by the user with respect to the client area E202 in the upward direction, which is the direction of the title area E200, the display controller 102 scroll-displays the display elements in the client area E202 in the upward direction. As a result, as shown in FIG. 8B, a screen display W202 is displayed on the display unit 110 of the image forming device 10, in which the confirmation button B200 is in the partially displayed state in the client area E202. In this case, as shown in FIG. 8B, the display controller 102 displays part of the accommodatively displayed confirmation button M200 in the title area E200.

When an additional scroll operation is performed by the user with respect to the client area E202 in the upward direction, which is the direction of the title area E200, the confirmation button B200 is entirely no longer displayed in the client area E202. In such a case, the display controller 102 displays the accommodatively displayed confirmation button M200 in the title area E200.

When a scroll operation is performed in the downward direction, which is the opposite direction to the title area E200, the display controller 102 displays the screens shown in FIG. 8B and FIG. 8A according to the size of the confirmation button B200 displayed in the client area E202. That is to say, if the confirmation button B200 serving as the specific display element is partially displayed in the client area E202 as a result of the scroll operation, the display controller 102 partially displays the accommodatively displayed confirmation button M200 in the title area E200. Furthermore, if the entire confirmation button B200 serving as the specific display element is displayed in the client area E202, the display controller 102 removes the accommodatively displayed confirmation button M200 from the title area E200.

According to the present embodiment, when a scroll operation is performed, it is possible for the size of the accommodatively displayed specific display element to be changed according to the scroll amount of the operation. As a result, it becomes possible for the accommodatively displayed specific display element to be visually confirmed by the user in a more natural fashion.

3. Third Embodiment

Next, a third embodiment will be described. The third embodiment is an embodiment in which a predetermined area (hereinafter referred to as "menu area") is provided inside the client area, and a button included in the menu area is designated as the specific display element. The present embodiment replaces FIG. 3 of the first embodiment with FIG. 9. In addition, the same reference numerals are given to the same functional units and processing, and the description will be omitted.

Furthermore, in the present embodiment, the menu area button is assumed to be in the displayed state as long as part or all of the menu area button is displayed in the client area. A state where the entire menu area button is not displayed in the client area is referred to as the non-displayed state.

3.1 Processing Flow

Figure 9:
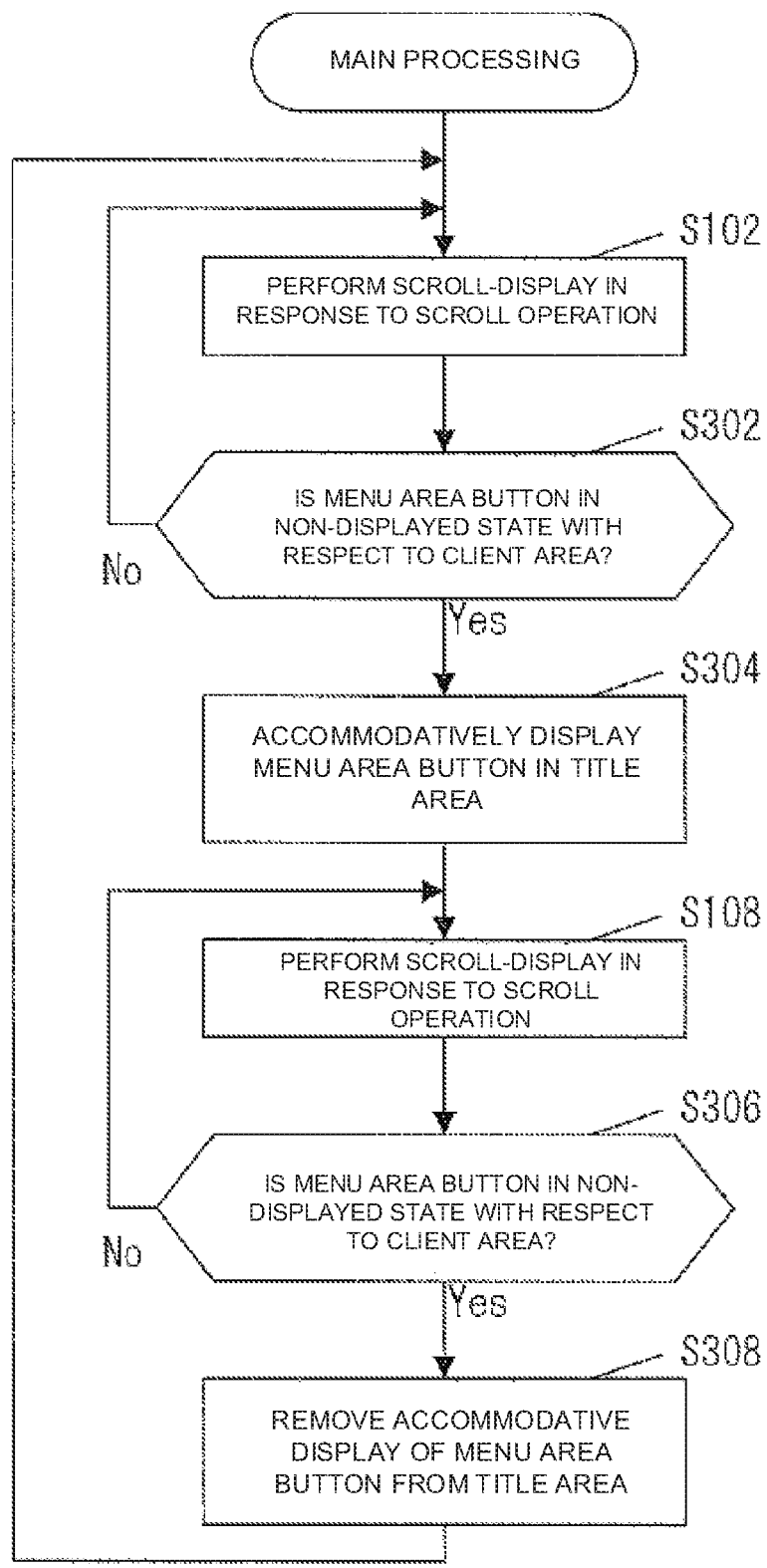
FIG. 9 is a flow diagram for illustrating main processing in a display controller of a third embodiment.

The flow of processing in the present embodiment will be described with reference to FIG. 9. First, the display controller 102 scroll-displays the display elements inside the client area according to a scroll operation (step S102). Next, the display controller 102 determines whether or not the menu area button serving as the specific display element is in the non-displayed state with respect to the client area, as a result of a scroll operation by the user in the direction of the title area (step S302).

If the menu area button serving as the specific display element is in the non-displayed state with respect to the client area, the display controller 102 accommodatively displays the menu area button in the title area (step S302; Yes→step S304).

The display controller 102 may accommodatively display the menu area button based on the horizontal position of the button disposed in the menu area. In such a manner, the user is capable of rapidly visually confirming the position of the button included in the menu area by viewing the title area. The menu area may be an area which is larger (taller) than the title area. In this case, the display controller 102 displays, as the menu area button, a graphic in which the menu area button has been reduced in size.

If the menu area button is in the displayed state in the client area, the sequence returns to step S102 (step S302; No→step S102).

Next, in a state where the menu area button is displayed in the title area, the display controller 102 scroll-displays the display elements inside the client area in response to the scroll operation (step S108). Then, if the menu area button is in the displayed state in the client area, the display controller 102 removes the accommodatively displayed menu area button from the title area (step S306; Yes→step S308). Then, the sequence returns to step S102.

3.2 Operation Example

Figure 10A:
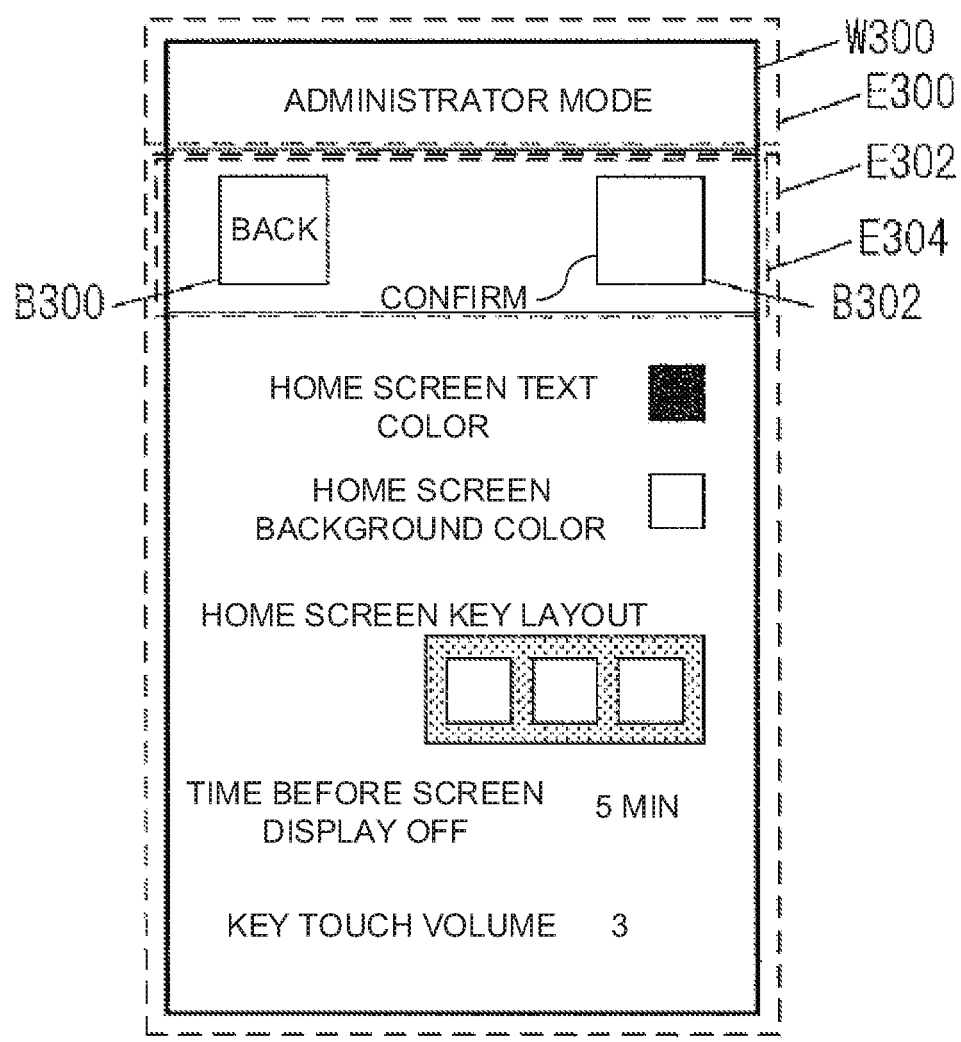
FIGS. 10A to 10C are diagrams for illustrating an operation example of the third embodiment.
Figure 10B:
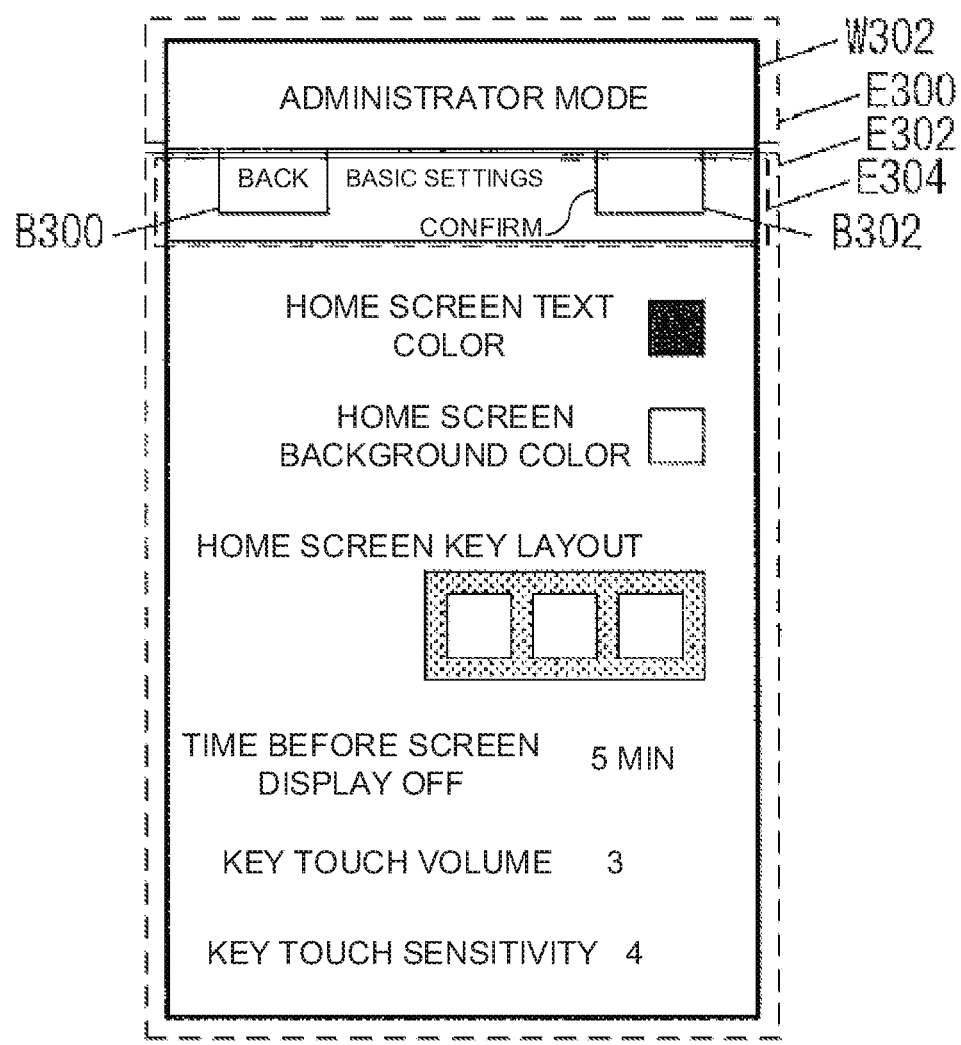
Figure 10C:
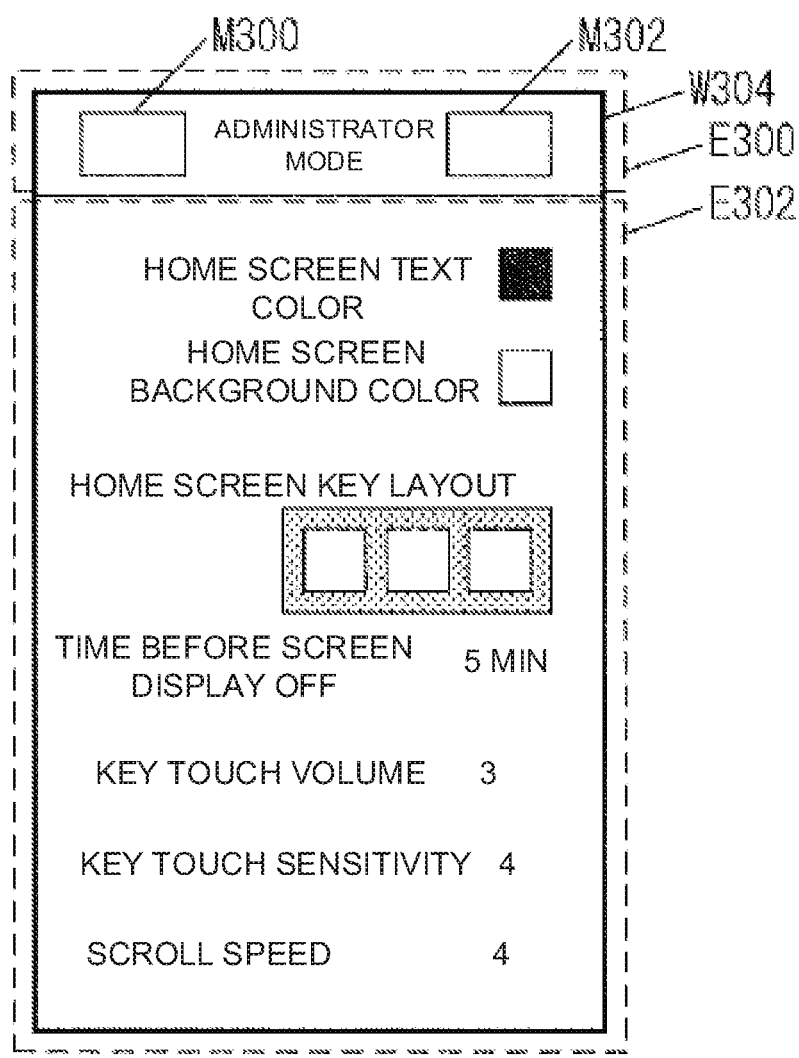

Next, an operation example of the present embodiment will be described with reference to the drawings. First, an operation that accommodatively displays the menu area button in the title area will be described with reference to FIGS. 10A to 10C. FIG. 10A is a display example of an initial state of a setting screen of the image forming device 10. FIG. 10B is a display example when a scroll operation is being performed in the direction of the title area. FIG. 10C is a display example of a case where the menu area button is in the non-displayed state with respect to the client area.

As shown in FIG. 10A, the display unit 110 of the image forming device 10 displays, as a screen display W300, a display including a title area E300 and a client area E302. The title area E300 displays the character string "administrator mode" as the title of the screen display W300. The client area E302 includes display elements such as a button, and further includes a menu area E304. The menu area E304 includes a user-selectable return button B300 and a confirmation button B302, and further, displays the character string "basic settings" as a subtitle. The return button B300 and the confirmation button B302 are specific display elements.

When a scroll operation is performed by the user with respect to the client area E302 in the upward direction, which is the direction of the title area E300, the display controller 102 displays the screen display W302 shown in FIG. 10B, in which the display elements of the client area E302 are scroll-displayed. As shown in FIG. 10B, the display controller 102 displays the display elements included in the client area E302 such that they are hidden below the title area E300, while the position of the title area E300 is kept fixed. For example, the menu area E304 is displayed such that it overlaps the title area E300.

When an additional scroll operation is performed by the user with respect to the client area E302 in the upward direction, which is the direction of the title area E300, the display controller 102 displays the screen display W304 shown in FIG. 10C on the display unit 110 of the image forming device 10. In this manner, the menu area E304 is in the non-displayed state with respect the client area E302 when the scroll amount becomes large. Furthermore, the return button B300 and the confirmation button B302 included in the menu area E304 similarly are in the non-displayed state with respect to the client area E302.

In response to the return button B300 and the confirmation button B302 serving as specific display elements being in the non-displayed state with respect to the client area E302, the display controller 102 accommodatively displays the return button B300 and the confirmation button B302 of the menu area E304 in the title area E300. For example, as shown in FIG. 10C, an accommodatively displayed return button M300 and an accommodatively displayed confirmation button M302 are displayed in the title area E300. As a result of such a display, the user is capable of visually confirming the presence of the return button B300 and the confirmation button B302.

Furthermore, in the state shown in FIG. 10C, when a scroll operation is performed with respect to the client area E302 in the downward direction, which is the opposite direction to the title area E300, the display controller 102 displays the screens shown in FIG. 10B and FIG. 10A according to the state of the display in the client area E302. That is to say, if the return button B300 and the confirmation button B302 serving as specific display elements are in the displayed state as a result of the scroll operation performed by the user in the downward direction, which is the opposite direction to the title area E300, the accommodatively displayed return button M300 and the accommodatively displayed confirmation button M300 are removed from the title area E300.

Figure 11A:
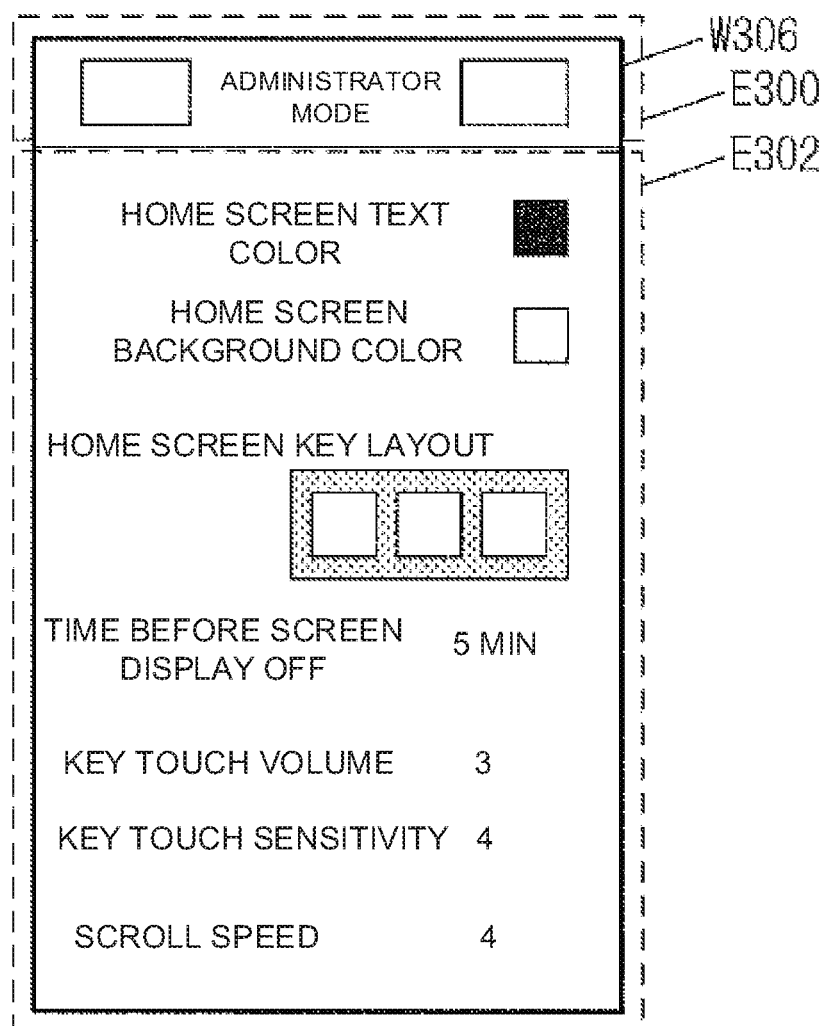
FIGS. 11A and 11B are diagrams for illustrating an operation example of the third embodiment.
Figure 11B:
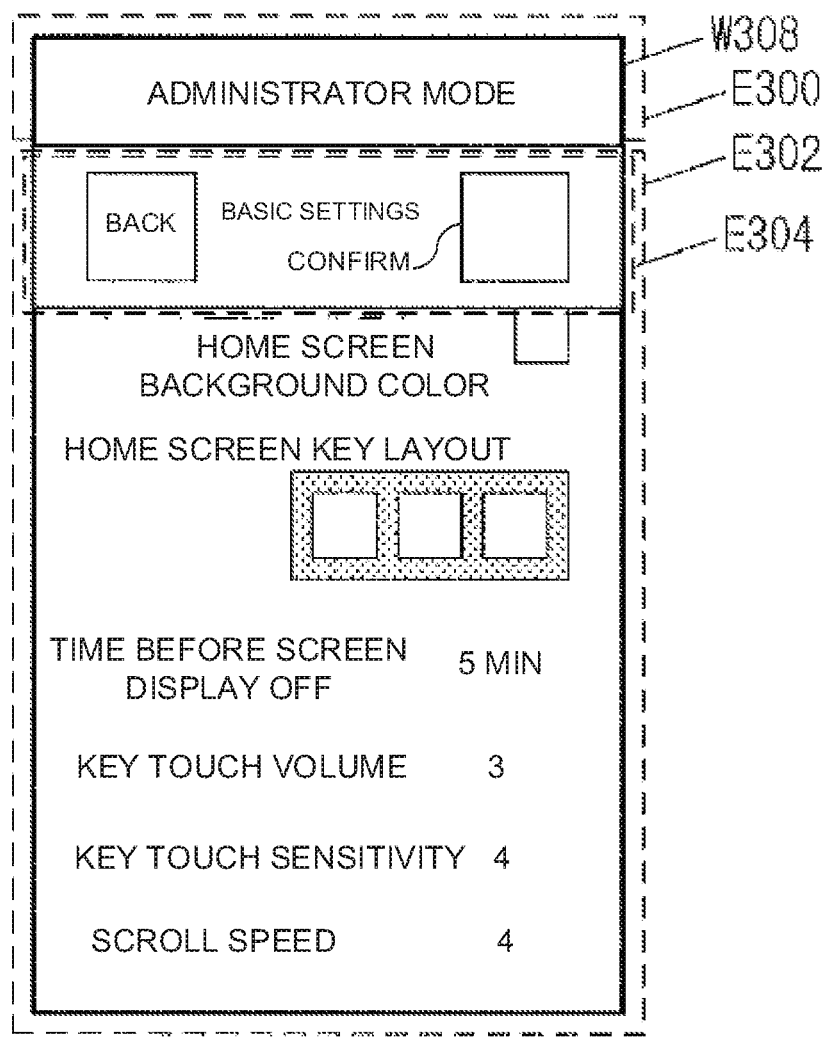

When the accommodatively displayed return button M300 and the accommodatively displayed confirmation button M302 are displayed in the title area E300, the menu area E304, which includes the return button B300 and the confirmation button B302 serving as specific display elements, may be displayed in the client area E302 in response to a user operation. For example, suppose that, as illustrated by the screen display W306 shown in FIG. 11A, the display unit 110 is in a state where the accommodatively displayed return button M300 and the accommodatively displayed confirmation button M302 are displayed in the title area E300. In this state, if a scroll operation is performed in the downward direction, which is the opposite direction to the title area E300, the display controller 102 displays the screen display W308 shown in FIG. 11B, in which the menu area E304 overlaps the client area E302. Furthermore, in the state shown in FIG. 11B, if a scroll operation is performed in the upward direction, which is the direction of the title area E300, the display controller 102 removes the area E304, and displays the screen display W306 shown in FIG. 11A. In this manner, when the user would like to display a button included in the menu area, the button included in the menu area can be immediately displayed by performing a scroll operation in the opposite direction to the direction of the title area E300. If an operation that selects the title area E300 is performed in the state shown in FIG. 11A, the display controller 102 may also display the menu area E304 such that it overlaps the client area E302.

In the present embodiment, it is assumed that, in the same manner as the first embodiment, the specific display element adopts either the displayed state or the non-displayed state with respect to the client area. However, it may also be in a partially displayed state as described in the second embodiment. In this case, in the same manner as the second embodiment, the display controller 102 displays part of the accommodatively displayed menu area button in the title area when the menu area button is in the partially displayed state in the client area.

According to the present embodiment, even when the specific display element is included in an area occupying a fixed area, it is possible to cause the user to visually confirm the position and presence of the specific display element included in the area. Furthermore, when a scroll operation is performed in the opposite direction to the title area, the area including the specific display element is immediately displayed. Therefore, the display area can be efficiently used.

4. Fourth Embodiment

Next, a fourth embodiment will be described. The fourth embodiment is an embodiment in which, in addition to the operation of the third embodiment, a menu area is additionally displayed when a display element other than the specific display element is selected by the user to change the display content inside the menu area or the processing content. The present embodiment replaces FIG. 9 of the third embodiment with FIG. 12. In addition, the same reference numerals are given to the same functional units and processing, and the description will be omitted.

In the present embodiment, the description assumes that the menu area includes a button serving as the specific display element. Furthermore, the description assumes that when a display element other than the specific display element included in the client area is selected by the user, a character string displayed on the button serving as the specific display element, and the processing performed when the button is selected by the user, are changed. In the present embodiment, performing a control in this manner which displays a different form of the original button, or performs processing when the button is selected which is different to the processing performed when the original button is selected, is referred to as a role change. As a result of performing a role change with respect to a button serving as the specific display element, a button that accepts an instruction to execute predetermined processing can be displayed as a button that accepts an instruction to execute different predetermined processing.

4.1 Processing Flow

Figure 12:
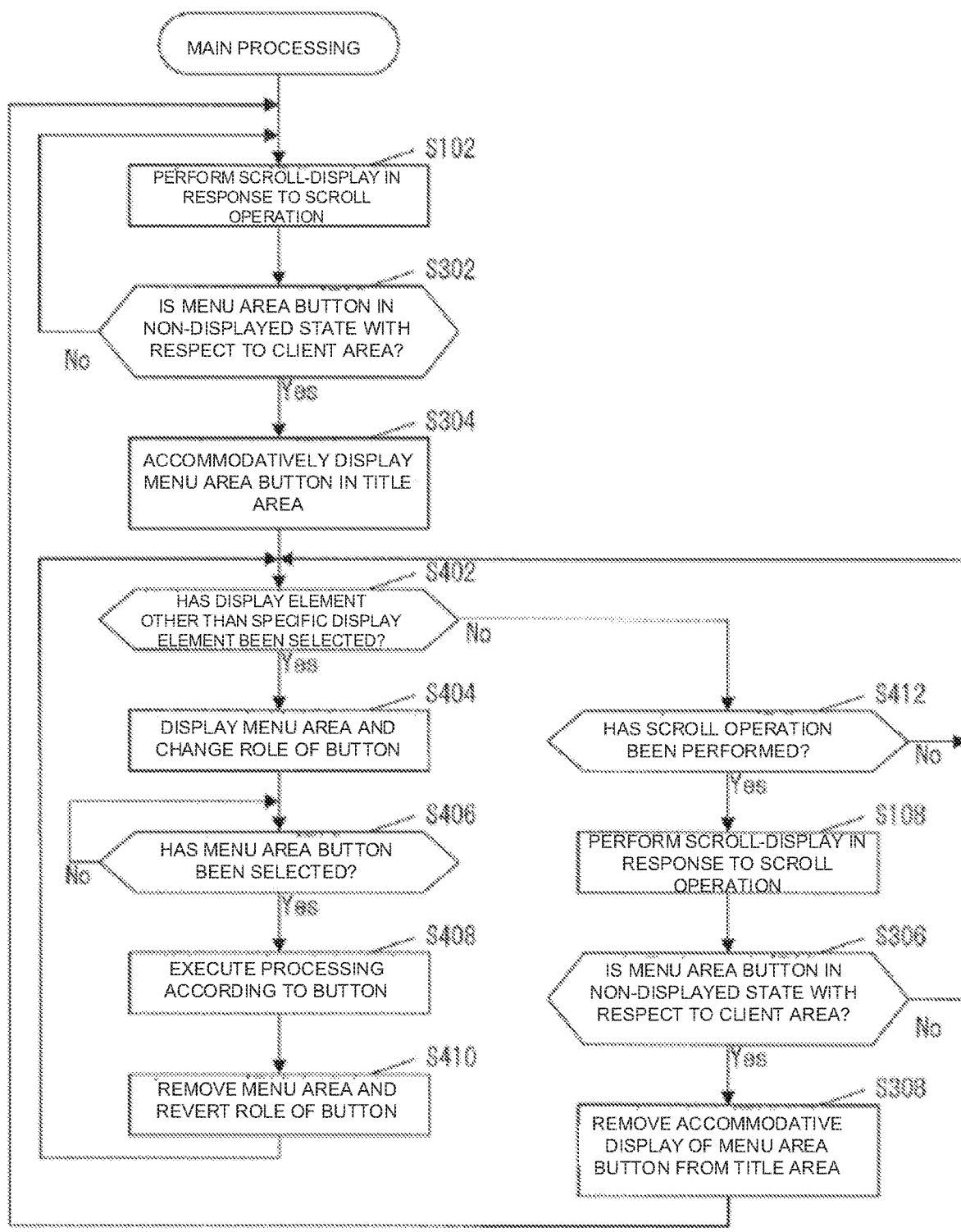
FIG. 12 is a flow diagram for illustrating main processing in a display controller of a fourth embodiment.

The flow of processing in the present embodiment will be described with reference to FIG. 12. In step S304, after the accommodatively displayed menu area button is displayed in the title area, the display controller 102 determines whether or not a display element other than the specific display element included in the client area has been selected by the user (step S402).

If a display element other than the specific display element has been selected by the user, the display controller 102 then displays the menu area in the client area, and changes the role of the button included in the menu area (step S402; Yes→step S404). At this time, the display controller 102 changes the role of the button according to the display element selected by the user.

The response related to how the role of the button is changed depending on the display element that is selected may be set in advance by the designer of the image forming device 10 or the like.

Next, after the button disposed in the menu area is selected, the controller 100 executes the processing corresponding to the selected button (step S406; Yes→step S408). Then, the display controller 102 removes the menu area from the client area and returns the role of the button to the initial role (step S410). Then, the sequence returns to step S402.

In step S402, if a display element is not selected, the controller 100 determines whether or not a scroll operation has been performed (step S402; No→step S412). If a scroll operation has been performed, the display controller 102 scroll-displays the client area according to the scroll operation (step S412; Yes→step S108).

If the menu area button is in the displayed state in the client area, the display controller 102 removes the accommodatively displayed menu area button from the title area (step S306; Yes→step S308). In step S306, if the menu area confirmation button is not in the displayed state in the client area, the sequence returns to step S412 (step S306; No→step S402).

In step S410, the role of the menu area button is reverted back. Therefore, in those cases where the menu area is displayed after being scrolled in the opposite direction to the direction of the title area and the like, and the menu area button disposed in the client area is in the displayed state, the original button is displayed in the client area. Furthermore, if the button included in the menu area is selected, the controller 100 executes processing based on the role of the original button.

In this manner, the user is capable causing a menu area button displayed as a result of selecting a display element other than the specific display element, and a menu area button displayed as a result of an operation other than an operation that selects a display element other than the specific display element, to execute different instructions.

4.2 Operation Example

Figure 13A:
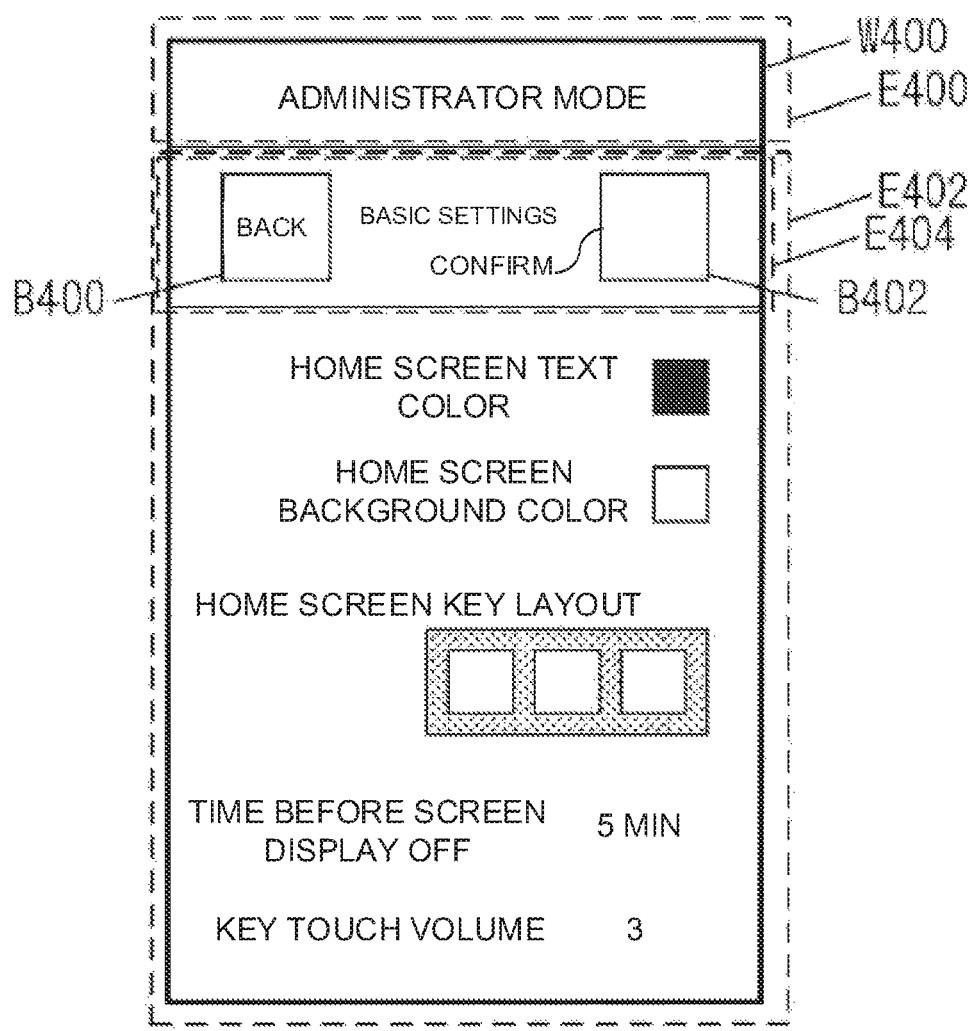
FIGS. 13A to 13C are diagrams for illustrating an operation example of the fourth embodiment.
Figure 13B:
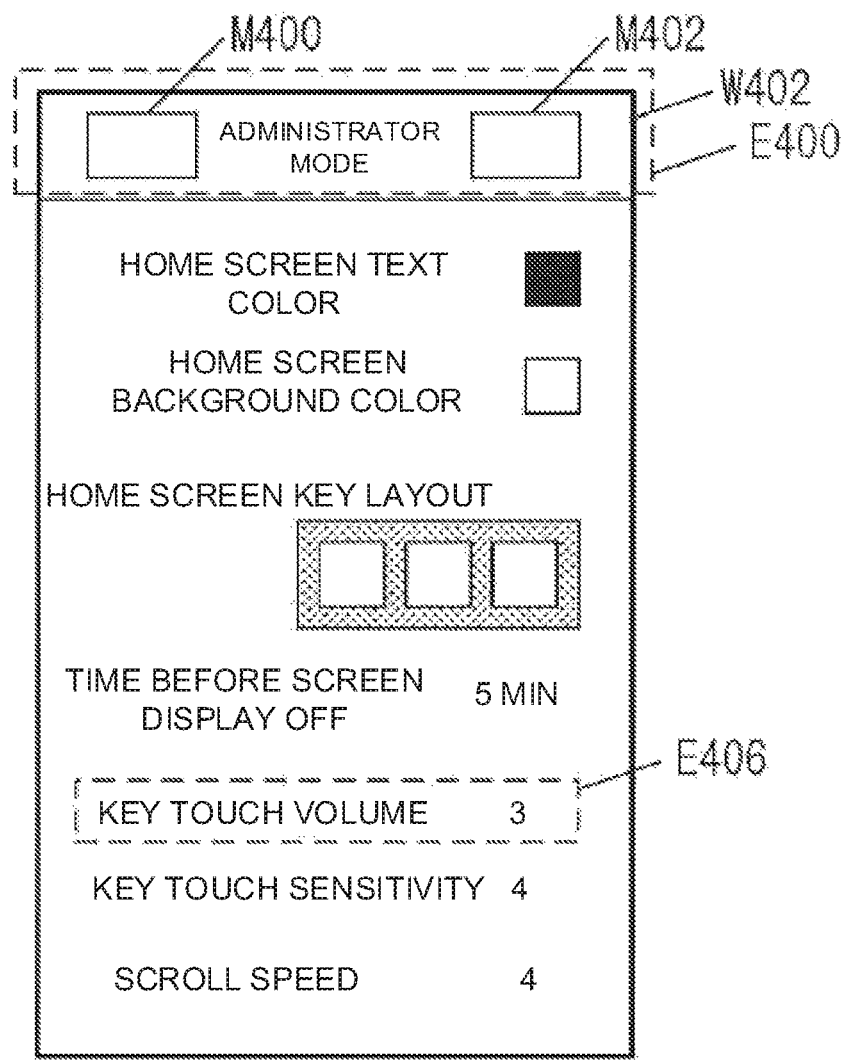
Figure 13C:
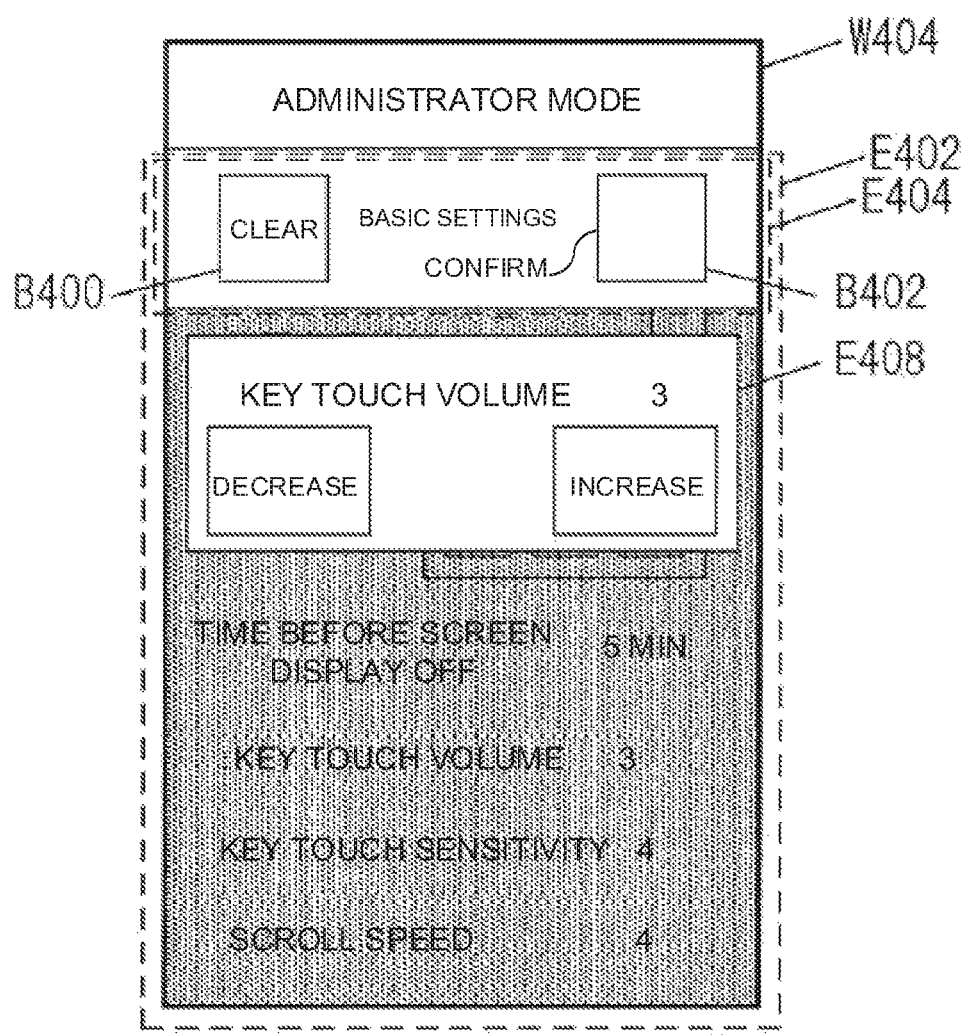

Next, an operation example of the present embodiment will be described with reference to FIG. 13. FIG. 13A is a display example of an initial state of a setting screen of the image forming device 10. FIG. 13B is a display example of a state where the accommodatively displayed menu area button is displayed in the title area. FIG. 13C is a display example in a case where a display element other than the specific display element included in the client area is selected.

As shown in FIG. 13A, the display unit 110 of the image forming device 10 displays, as a screen display W400, a display including a title area E400 a client area E402. The title area E400 displays the character string "administrator mode" as the title of the screen display W400.

The client area E402 includes display elements such as a button, and further, a menu area E404 is disposed therein. The menu area E404 has user-selectable buttons B400 and B402 disposed therein, and further, displays the character string "basic settings" as a subtitle. The client area also displays display elements other than the specific display element (for example, a display element E406 that represents a label or button for setting a key touch volume).

Here, the button B400 is a "return" button for cancelling the content that has been set in the basic settings screen, and for returning to the original screen. Furthermore, the button B402 is a "confirm" button for confirming the content that has been set in the basic settings screen, and for returning to the original screen.

FIG. 13B is a display example of a screen display W402 when a scroll operation is performed by the user with respect to the client area E402 in the direction of the title area E400. The title area E400 displays, as the buttons of the accommodatively displayed menu area E404, an accommodative display M400 of the button B400, and an accommodative display M402 of the button B402.

Furthermore, FIG. 13C shows a display example of a screen display W404 displayed when the display element E406, which represents a display element other than the specific display element, is selected from among the display elements shown in FIG. 13B. As shown in FIG. 13C, the menu area E404 is displayed in the screen display W404 such that it overlaps the client area E402. Furthermore, a pop-up area E408 based on the display element selected by the user is displayed such that it overlaps the client area E402. At this time, the client area E402 is grayed out.

The menu area E404 includes the buttons B400 and B402. However, the roles of the buttons B400 and B402 are changed. For example, the role of the button B400 is changed to that of a "clear" button for clearing the operation performed by the user with respect to the pop-up area E408. Furthermore, the role of the button B402 is changed to that of a "confirm" button for confirming the operation performed by the user with respect to the pop-up area E408.

For example, in the example of FIG. 13C, the pop-up area E408 for setting a key touch volume includes an "increase" button for increasing the key touch volume, and a "decrease" button for decreasing the key touch volume. The user sets the key touch volume by selecting the "increase" button and the "decrease button". Furthermore, after the key touch volume is set, if the "confirmation" button B402 for confirming the key touch volume is selected, the set key touch volume is confirmed. Moreover, if the "clear" button B400 is selected, the key touch volume is reverted back to the setting when the pop-up area E408 was displayed, irrespective of the set key touch volume.

In addition, when either the "clear" button B400 or the "confirm" button B402 is selected by the user, the display controller 102 removes the menu area E404 and the pop-up area E408, and displays the buttons of the accommodatively displayed menu area in the title area E400. That is to say, the state reverts back to that of the screen display W402 shown in FIG. 13B.

In this manner, although the buttons B400 and B402 were originally buttons for returning from the basic settings screen to the original screen, they become buttons for confirming operations with respect to a pop-up area when a display element in the client area E402 is selected. In this manner, the roles of the buttons serving as specific display elements, which disposed in the menu area, can be changed.

According to the present embodiment, even when the menu area is not displayed by the client area, it becomes possible to display, in response to the user selecting a display element, buttons and the like in the menu area for inputting an instruction relating to the selected display element. In addition to being able to effectively use the display area, for users, an improvement in user operability can be expected because an operation for displaying the menu area is not required.

5. Modifications

The embodiments of the present invention were described in detail above with reference to the drawings. However, specific configurations are in no way limited to the embodiments, and designs and the like within a scope not departing from the spirit of the present invention are included in the scope of the claims. Furthermore, the embodiments described above have portions described separately for convenience of description. However, it is needless to say that these may be combined within a technically possible range.

Moreover, in terms of the processing flows, the order of the steps may be changed and some steps may be omitted to an extent that does not cause inconsistencies, even if the modifications are outside the description above. In addition, the embodiments described above may of course be implemented by combining the respective embodiments.

Furthermore, a program that operates in each device in the embodiments is a program that controls a CPU or the like (a program that causes a computer to function) so as to realize the functions of the embodiments described above. Further, the information handled by these devices is temporarily stored in a temporary storage device (such as a RAM) at the time of processing, and subsequently stored in storage devices such as various ROMs, HDDs, and SSDs. Then, the information is read, corrected, and written as necessary by the CPU.

When distributed in the market, the program can be stored and distributed in a portable recording medium, or transferred to a server computer connected via a network such as the Internet. In this case, it is needless to say that the storage device of the server computer is included in the present invention.

What is claimed is:

1. A display device comprising:
a processor;
wherein the processor controls
an operation detector that detects an operation;
a display that displays a screen including a first area capable of being scroll-displayed, and a second area which does not overlap with the first area; and
a display controller that performs a control that displays, in the first area, display elements including a specific display element which is included as a part of the first area, wherein
the display controller, in a state where both the first area and the second area are displayed at the same time,
scroll-displays the display elements displayed in the first area when the operation detector detects a scroll operation, and
accommodatively displays an image of a part corresponding to the specific display element over the display content which has been displayed in the second area before scroll-displaying and does not display an image of a part corresponding to the display elements other than the specific display element in the second area if, as a result of the scroll-display, the specific display element is scrolled in the direction of the second area and displayed,
a size of the first area and a size of the second area remains the same before and after the scroll operation, and
the specific display element is a confirmation button for confirming settings.

2. The display device according to claim 1, wherein the display controller performs a control that displays one of a specific display element and an accommodatively displayed image of the part corresponding to specific display element.

3. The display device according to claim 1, wherein the display controller performs a control that changes a size of an accommodatively displayed image of the part corresponding to specific display element displayed in the second area according to a size of a specific display element displayed in the first area.

4. The display device according to claim 1, wherein when the operation detector detects an operation that selects the accommodatively displayed image of the part corresponding to specific display element, the display controller displays the specific display element in the first area.

5. The display device according to claim 1, wherein when the accommodatively displayed image of the part corresponding to specific display element is displayed in the second area and a scroll operation is performed in a reverse direction to the second area, the display controller displays the specific display element in the first area.

6. The display device according to claim 1, wherein when the accommodatively displayed image of the part corresponding to specific display element is displayed in the second area and the operation detector detects an operation that selects a display element other than the specific display element, the display controller displays the specific display element in the first area.

7. The display device according to claim 1, wherein
the specific display element is a display element that accepts an instruction to execute predetermined processing, and
when the operation detector detects an operation that selects a display element other than the specific display element and the specific display element is displayed in the first area, the display controller displays the specific display element as a display element capable of accepting execution of processing different from the predetermined processing.

8. The display device according to claim 1, wherein the second area is a smaller area than the first area.

9. The display device according to claim 1, wherein the display controller maintains a size of the second area even when the display controller scroll-displays the display elements displayed in the first area.

10. The display device according to claim 1, wherein the specific display element is an icon of a confirmation button for accepting an instruction of selection by user.

11. The display device according to claim 1, wherein the display controller always displays the image of a part of the specific display element in the second area in a case that the specific display element is not displayed in the first area even when the display elements in the first area are scroll-displayed.

12. A display method comprising:
detecting an operation;
displaying a screen including a first area capable of being scroll-displayed, and a second area which does not overlap with the first area; and performing a control that displays, in a part of the first area, display elements including a specific display element, wherein performing the control includes, in a state where both the first area and the second area are displayed at the same time, scroll-displaying the display elements displayed in the first area when a scroll operation is detected, and accommodatively displaying an image of a part of the specific display element over the display content which has been displayed in the second area before scroll-displaying and does not display an image of a part of the display elements other than the specific display element in the second area if, as a result of the scroll-display, the specific display element is scrolled in the direction of the second area and displayed, wherein a size of the first area and a size of the second area remains the same before and after the scroll operation, and the specific display element is a confirmation button for confirming settings.

13. A non-transitory computer readable recording medium storing a program that causes a computer to implement:

an operation detection function that detects an operation;

a display function that displays a screen including a first area capable of being scroll-displayed, and a second area which does not overlap with the first area; and a display control function that performs a control that displays, in a part of the first area, display elements including a specific display element, wherein the display control function, in a state where both the first area and the second area are displayed at the same time, scroll-displays the display elements displayed in the first area when the operation detection function detects a scroll operation, and accommodatively displays an image of a part of the specific display element over the display content which has been displayed in the second area before scroll-displaying and does not display an image of a part of the display elements other than the specific display element in the second area if, as a result of the scroll-display, the specific display element is scrolled in the direction of the second area and displayed, wherein a size of the first area and a size of the second area remains the same before and after the scroll operation, and the specific display element is a confirmation button for confirming settings.

\* \* \* \* \*